(12) United States Patent
Kitahara

(10) Patent No.: US 8,684,837 B2
(45) Date of Patent: Apr. 1, 2014

(54) INFORMATION PROCESSING PROGRAM, INFORMATION PROCESSING SYSTEM, INFORMATION PROCESSING APPARATUS, AND INFORMATION PROCESSING METHOD

(75) Inventor: Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 189 days.

(21) Appl. No.: 13/156,690

(22) Filed: Jun. 9, 2011

(65) Prior Publication Data

US 2012/0172127 A1 Jul. 5, 2012

(30) Foreign Application Priority Data

Dec. 29, 2010 (JP) ................................. 2010-294483

(51) Int. Cl.
*G06F 17/00* (2006.01)
(52) U.S. Cl.
USPC ............... 463/31; 463/30; 345/619; 345/632; 345/633
(58) Field of Classification Search
USPC ........................ 463/30, 31; 345/619, 632, 633
See application file for complete search history.

(56) References Cited

U.S. PATENT DOCUMENTS

2006/0223635 A1* 10/2006 Rosenberg ....................... 463/37
2010/0045869 A1*  2/2010 Baseley et al. ................ 348/598
2010/0277468 A1* 11/2010 Lefevre et al. ................ 345/419

FOREIGN PATENT DOCUMENTS

JP 2008-113746 5/2008

OTHER PUBLICATIONS

Fracture. Amazon.com. Online. Accessed via the Internet. Accessed Feb. 7, 2013. <URL:http://www.amazon.com/Fracture-Xbox-360/dp/B000R0RHA4/ref=sr_1_1?ie=UTF8&qid=1360259533&sr=8-1>.*
"Fracture Terrain Deformation Trailer". Youtube.com. Online. Jun. 8, 2007. Accessed via the Internet. Accessed Feb. 7, 2013. <URL:http://www.youtube.com/watch?v=JYu5y-eUBvY>.*
"How to repeat a texture on a model". Garagegames.com. Online. Oct. 28, 2009. Accessed via the Internet. Accessed Sep. 7, 2013. <URL:http://www.garagegames.com/community/forums/viewthread/103381/2>.*

* cited by examiner

*Primary Examiner* — Dmitry Suhol
*Assistant Examiner* — Carl V Larsen
(74) *Attorney, Agent, or Firm* — Nixon & Vanderhye, P.C.

(57) ABSTRACT

A moving object and a topography object having a portion with different heights are positioned in a virtual space, and the moving object is controlled so as to move on the topography object. A real world image is obtained from an imaging device, and a position and an orientation of a marker in the real world image are detected. On the basis of a result of the detection, a virtual camera is positioned in the virtual space, and a moving object and a topography object are rendered on the basis of the virtual camera. Here, the real world image obtained from the imaging device is used as a texture for the topography object. The rendered moving object and the topography object are synthesized on the real world image and a synthesized image is displayed on a display device.

19 Claims, 21 Drawing Sheets

INFORMATION PROCESSING PROGRAM, INFORMATION PROCESSING SYSTEM, INFORMATION PROCESSING APPARATUS, AND INFORMATION PROCESSING METHOD

CROSS REFERENCE TO RELATED APPLICATION

The disclosure of Japanese Patent Application No. 2010-294483, filed on Dec. 29, 2010, is incorporated herein by reference.

BACKGROUND OF THE INVENTION

1. Field of the Invention

The present invention relates to an information processing program, an information processing system, an information processing apparatus, and an information processing method. The present invention more particularly relates to an information processing program, an information processing system, an information processing apparatus, and an information processing method, which apply an augmented reality technique.

2. Description of the Background Art

Japanese Laid-Open Patent Publication No. 2008-113746 discloses a game apparatus which displays a ball object together with a character on a game card, and which provides, in response to a player's operation performed on the game card, a representation in which a ball object rolling in a direction in accordance with an orientation of the game card and a plurality of pin objects displayed on another game card being knocked down.

The game apparatus disclosed in Japanese Laid-Open Patent Publication No. 2008-113746 provides a representation merely indicating the ball object rolling on a plane, and thus a user cannot feel a sense of reality, as if the virtual object exists and is moving in a real space.

SUMMARY OF THE INVENTION

In order to solve the above problem, the present invention has the following features.

A computer-readable storage medium according to one configuration example of the present invention is a computer-readable storage medium having stored therein an information processing program. The information processing program causes a computer of an information processing apparatus connected with an imaging device and a display device to function as real world image obtaining means, moving object positioning means, topography object positioning means, movement control means, texture mapping means, virtual space image generation means, and display control means.

The real world image obtaining means obtains a real world image by capturing an image of a real world by using the imaging device. The moving object positioning means positions a moving object in a virtual space. The topography object positioning means positions a topography object having a portion with different heights in the virtual space. The movement control means moves the moving object depending on a shape of the topography object. The texture mapping means maps at least a part of the real world image as a texture onto the topography object. The virtual space image generation means generates a virtual space image by rendering the moving object and the topography object onto which at least the part of the real world image has been mapped as the texture. The display control means displays the virtual space image on the display device so as to be viewed by a user in a manner such that the virtual space image is superimposed on one of the real world image and the real world seen through a screen of the display device.

As another configuration example of the computer-readable storage medium, the information processing program may further cause the computer to function as deformation means for deforming the topography object positioned by the topography object positioning means.

According to the above configuration example, the user can have an unusual experience as if the real world is actually deformed.

As still another configuration example of the computer-readable storage medium, the deformation means may deform the topography object periodically over time.

As still another configuration example of the computer-readable storage medium, the deformation means may deform the topography object in a direction along a surface of the topography object.

As still another configuration example of the computer-readable storage medium, the deformation means may deform the topography object when a predetermined condition is satisfied.

As still another configuration example of the computer-readable storage medium, the topography object positioning means may include initial positioning means for positioning a planar topography object in the virtual space and initial deformation means for changing a height of at least a part of the planar topography object positioned by the initial positioning means.

According to the above configuration example, the user can easily recognize that the topography object (the topography object after having been deformed by the initial deformation means) is not planar.

As still another configuration example of the computer-readable storage medium, the information processing program may further cause the computer to function as detection means for detecting a predetermined object to be indentified from the real world image and virtual camera positioning means for positioning a virtual camera in the virtual space on the basis of a result of the detection by the detection means. The virtual space image generation means may render the moving object and the topography object on the basis of the virtual camera.

According to the above configuration example, a viewpoint of the virtual space image changes in accordance with the real world image taken by the imaging device. Accordingly, a manner in which the virtual space image is viewed changes in conjunction with the real world, thereby allowing the user to view as if the virtual objects in the virtual space actually exist in the real world.

As still another configuration example of the computer-readable storage medium, the imaging device and the display device are integrally provided with the information processing apparatus, and the movement control means may include moving direction determination means for determining a moving direction of the moving object on the basis of a position and an orientation of the information processing apparatus in the real world.

According to the above configuration example, the moving direction of the moving object can be designated by moving the information processing apparatus, which allows the user to easily designate the moving direction.

As still another configuration example of the computer-readable storage medium, the imaging device and the display device may be integrally provided with the information processing apparatus, and the movement control means may include moving speed determination means for determining a moving speed of the moving object on the basis of a position and an orientation of the information processing apparatus in the real world.

According to the above configuration example, the moving speed of the moving object can be designated by moving the information processing apparatus, which allows the user to easily designate the moving speed.

As still another configuration example of the computer-readable storage medium, the movement control means may move the moving object in accordance with an operation by the user, and the information processing program may further cause the computer to function as game process means for executing a predetermined game process on the basis of a position of the moving object which has been moved by the movement control means in the virtual space.

It should be noted that the information processing program can be stored in any type of computer-readable storage medium (for example, a flexible disk, a hard disk, an optical disc, a magneto-optical disc, a CD-ROM, a CD-R, a magnetic tape, a semiconductor memory card, a ROM, a RAM, and the like).

An information processing apparatus according to one configuration example of the present invention includes real world image obtaining means, moving object positioning means, topography object positioning means, movement control means, texture mapping means, virtual space image generation means, and display control means.

An information processing system according to an configuration example of the present invention includes an imaging device, a display device, real world image obtaining means, moving object positioning means, topography object positioning means, movement control means, texture mapping means, virtual space image generation means, and display control means.

An information processing method according to one configuration example of the present invention is an information processing method which is processed by a control section of the information processing apparatus. The information processing method includes a real world image obtaining step, a moving object positioning step, a topography object positioning step, a movement control step, a texture mapping step, a virtual space image generation step, and a display control step.

In the real world image obtaining step, the control section obtains a real world image by capturing an image of a real world by using an imaging device. In the moving object positioning step, the control section positions a moving object in a virtual space. In the topography object positioning step, the control section positions a topography object having a portion with different heights in the virtual space. In the movement control step, the control section moves the moving object depending on a shape of the topography object. In the texture mapping step, the control section maps at least a part of the real world image as a texture onto the topography object. In the virtual space image generation step, the control section generates a virtual space image by rendering the moving object and the topography object onto which at least the part of the real world image has been mapped as the texture. In the display control step, the control section displays the virtual space image on a display device so as to be viewed by a user in a manner such that the virtual space image is superimposed on one of the real world image and the real world seen through a screen of the display device.

An information processing system according to one configuration example of the present invention include a marker which is positioned in a real world, an imaging device, a display device, real world image obtaining means, detection means, virtual camera positioning means, moving object positioning means, topography object positioning means, movement control means, texture mapping means, virtual space image generation means, and display control means.

The real world image obtaining means obtains a real world image by capturing an image of the real world by using the imaging device. The detection means detects the marker from the real world image. The virtual camera positioning means positions a virtual camera in a virtual space on the basis of a result of the detection by the detection means. The moving object positioning means positions a moving object in the virtual space. The topography object positioning means positions a topography object having a portion with different heights in the virtual space. The movement control means moves the moving object depending on a shape of the topography object. The texture mapping means maps at least a part of the real world image as a texture onto the topography object. The virtual space image generation means generates a virtual space image by rendering, on the basis of the virtual camera, the moving object and the topography object onto which at least the part of the real world image has been mapped as the texture. The display control means displays the virtual space image on the display device so as to be viewed by a user in a manner such that the virtual space image is superimposed on one of the real world image and the real world seen through a screen of the display device.

According to the present invention, the user can have an unusual experience as if the real world is actually deformed.

These and other objects, features, aspects and advantages of the present invention will become more apparent from the following detailed description of the present invention when taken in conjunction with the accompanying drawings.

Figure 1:
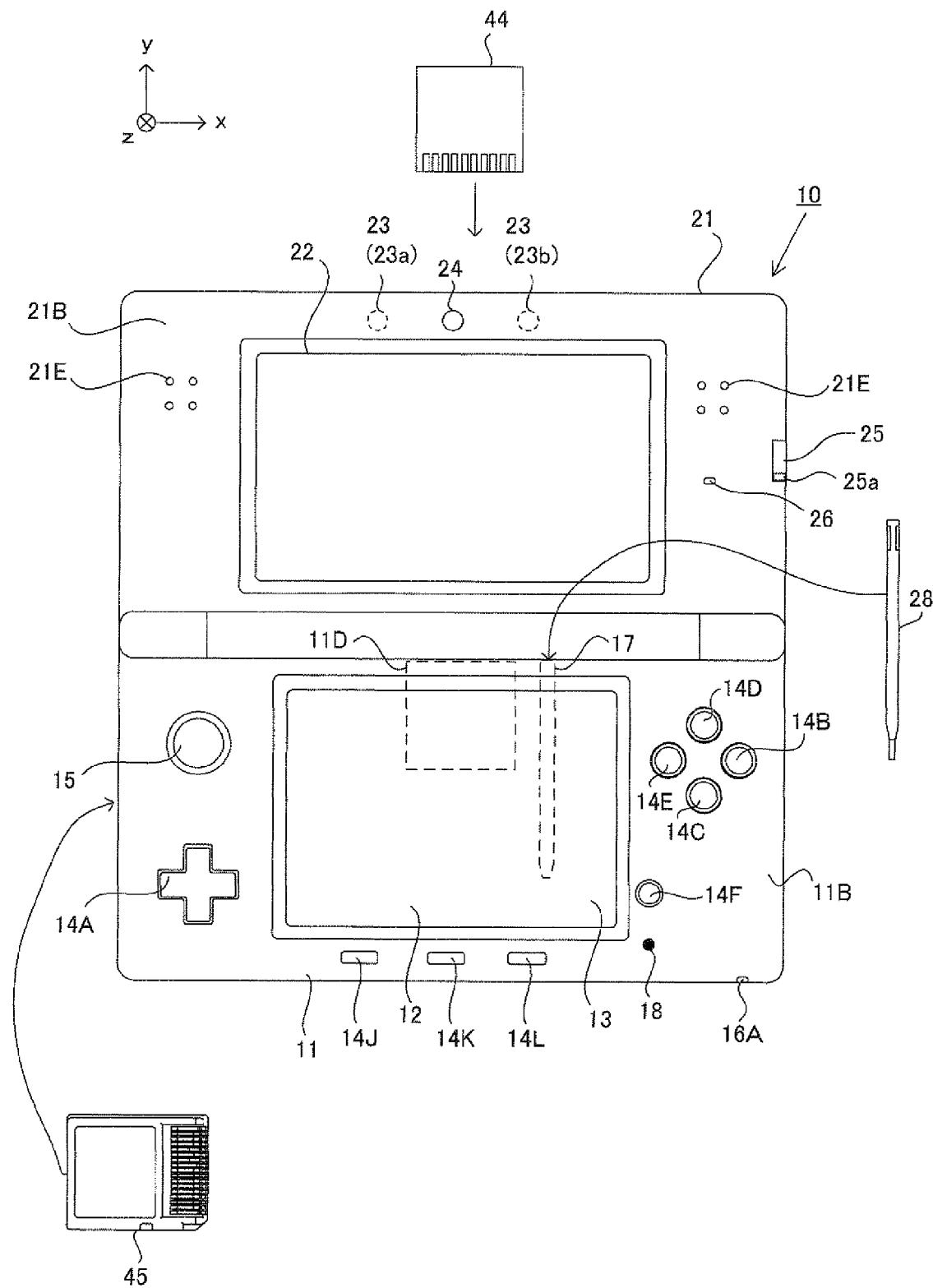
FIG. 1 is a front view of a game apparatus 10 in an opened state.

DESCRIPTION OF THE PREFERRED EMBODIMENTS (Configuration of Game Apparatus)

The following description is directed to a game apparatus according to one embodiment of the present invention. The game apparatus 10 is a portable game apparatus. As shown in FIG. 1 and FIGS. 2A to 2D, the game apparatus 10 includes a lower housing 11 and an upper housing 21. The lower housing 11 and the upper housing 21 are connected with each other so as to be openable and closable (foldable).

(Description of Lower Housing)

As shown in FIG. 1 and FIGS. 2A to 2D, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided.

The touch panel 13 is mounted on a screen of the lower LCD 12. The insertion opening 17 (indicated by dashed lines in FIG. 1 and FIG. 2D) is provided on the upper side surface of the lower housing 11 for storing a touch pen 28.

A cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11.

The analog stick 15 is a device for designating a direction.

The microphone hole 18 is provided on the inner side surface of the lower housing 11. Under the microphone hole 18, a microphone 42 (see FIG. 3) is provided as a sound input device described below.

Figure 2A:
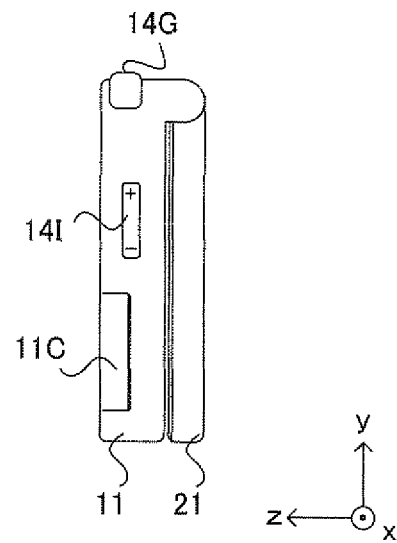
FIG. 2A is a left side view of the game apparatus 10 in a closed state.
Figure 2B:
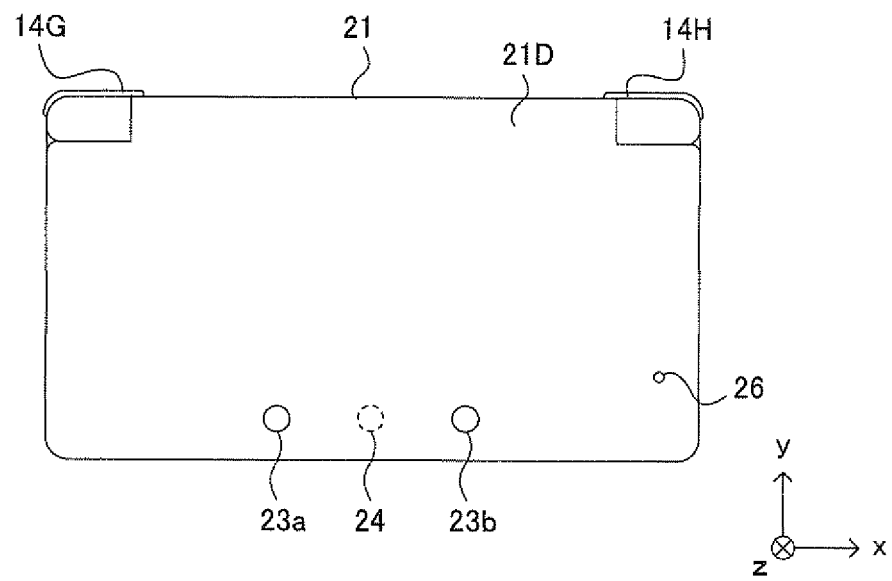
FIG. 2B is a front view of the game apparatus 10 in the closed state.
Figure 2C:
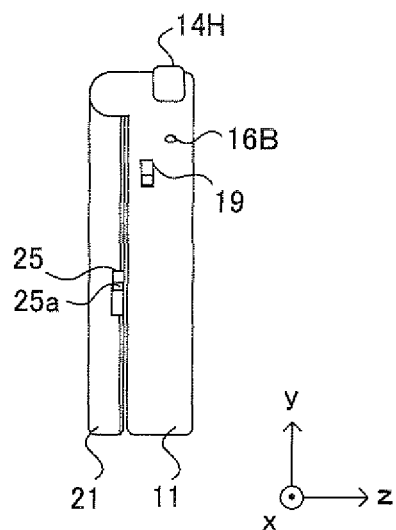
FIG. 2C is a right side view of the game apparatus 10 in the closed state.
Figure 2D:
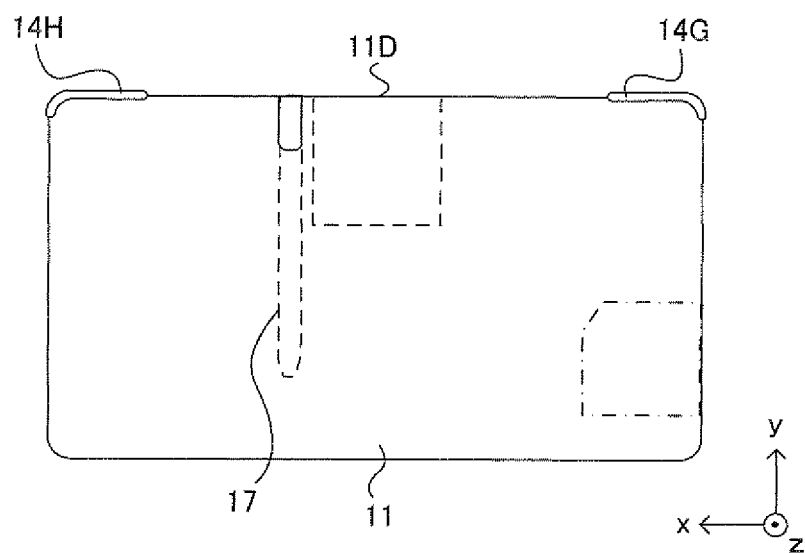
FIG. 2D is a back view of the game apparatus 10 in the closed state.

As shown in FIG. 2B and FIG. 2D, an L button 14G and an R button 14H are provided on the upper side surface of the lower housing 11. Further, as shown in FIG. 2A, a sound volume button 14I for adjusting a sound volume of a speaker 43 (see FIG. 3) included in the game apparatus 10 is provided on the left side surface of the lower housing 11.

As shown in FIG. 2A, a cover section 11C is provided on the left side surface of the lower housing 11 so as to be openable and closable. Inside the cover section 11C, a connector is provided for electrically connecting between the game apparatus 10 and an external data storage memory 45.

As shown in FIG. 2D, an insertion opening 11D for inserting an external memory 44 thereto is provided on the upper side surface of the lower housing 11.

As shown in FIG. 1 and FIG. 2C, a first LED 16A for notifying a user of an ON/OFF state of a power supply of the game apparatus 10 is provided on the lower side surface of the lower housing 11, and a second LED 16B for notifying the user of an establishment state of a wireless communication of the game apparatus 10 is provided on the right side surface of the lower housing 11. The game apparatus 10 can make wireless communication with other devices, and a wireless switch 19 for enabling/disabling the function of the wireless communication is provided on the right side surface of the lower housing 11 (see FIG. 2C).

(Description of Upper Housing)

As shown in FIG. 1 and FIGS. 2A to 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided.

The upper LCD 22 is a display device capable of displaying a stereoscopically visible image. Specifically, the upper LCD 22 is a display device capable of displaying an image which is stereoscopically visible by naked eyes using a parallax barrier method. The upper LCD 22 allows a user to view an image for a left eye with her/his left eye, and an image for a right eye with her/his right eye by utilizing a parallax barrier, so that an image (a stereoscopic image) exerting a stereoscopic effect for a user can be displayed. Further, the upper LCD 22 may disable the parallax barrier, and an image can be displayed in a planar manner when the parallax barrier is disabled. Accordingly, the upper LCD 22 is a display device capable of switching between a stereoscopic display mode for displaying a stereoscopic image and a planar display mode (for displaying a planar view image) for displaying an image in a planar manner. The switching of the display mode is performed by, for example, the 3D adjustment switch 25 described below.

Two imaging sections (23a and 23b) provided on the outer side surface 21D of the upper housing 21 are generically referred to as the outer imaging section 23. The outer imaging section (left) 23a and the outer imaging section (right) 23b can be used as a stereo camera depending on a program executed by the game apparatus 10.

The inner imaging section 24 is positioned on the inner side surface 21B of the upper housing 21, and acts as an imaging section which has an imaging direction which is the same direction as the inward normal direction of the inner side surface.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a.

The 3D indicator 26 is an LED for indicating whether or not the upper LCD 22 is in the stereoscopic display mode.

Further, a speaker hole 21E is provided on the inner side surface of the upper housing 21. A sound is outputted through the speaker hole 21E from the speaker 43 described below.

(Internal Configuration of Game Apparatus 10)

Figure 3:
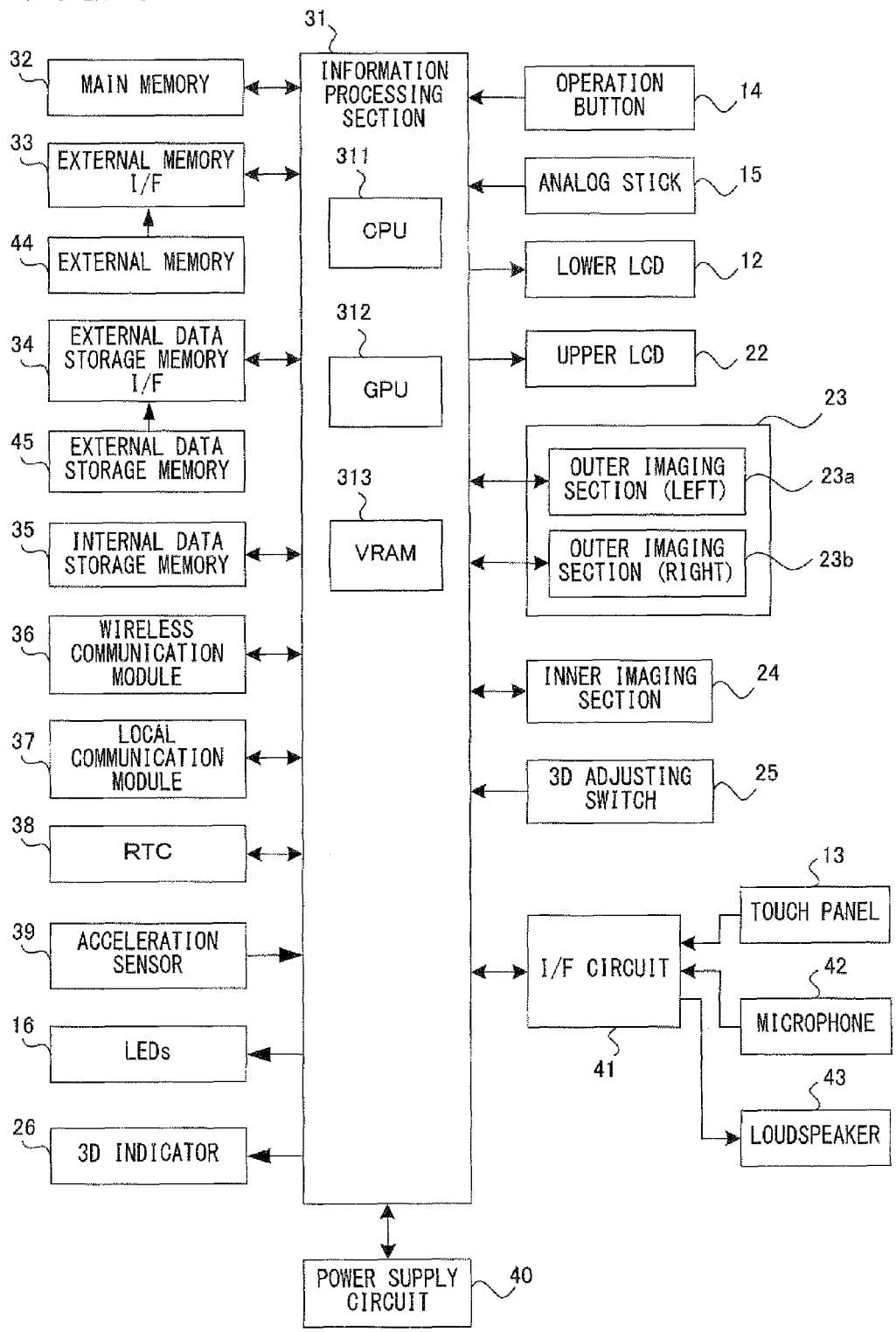
FIG. 3 is a block diagram showing an internal configuration of the game apparatus 10.

Next, with reference to FIG. 3, description will be made on an internal electrical configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like.

The information processing section 31 includes a CPU (Central Processing Unit) 311 for executing a predetermined program, a GPU (Graphics Processing Unit) 312 for performing image processing, and a VRAM (Video RAM) 313. The program executed by the CPU 311 may be acquired from another device through communication with the other device. The GPU 312 generates an image in accordance with an instruction from the CPU 311, and renders the image in the VRAM 313. The image rendered in the VRAM 313 is outputted to the upper LCD 22 and/or the lower LCD 12 to be displayed on the upper LCD 22 and/or the lower LCD 12.

The external memory I/F 33 is an interface for detachably connecting to the external memory 44. The external data storage memory I/F 34 is an interface for detachably connecting to the external data storage memory 45.

The main memory 32 is volatile storage device used as a work area and a buffer area for (the CPU 311 of) the information processing section 31.

The external memory 44 is non-volatile storage means for storing a program executed by the information processing section 31. The external memory 44 is implemented as, for example, a read-only semiconductor memory.

The external data storage memory 45 is implemented as a non-volatile readable and writable memory (for example, a NAND flash memory), and is used for storing any piece of data.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol, infrared communication).

The acceleration sensor 39 detects magnitudes of accelerations (linear accelerations) in the directions of the straight lines along the three axial (xyz axial) directions, respectively. The information processing section 31 can receive data (acceleration data) representing accelerations detected by the acceleration sensor 39, and detect an orientation and a motion of the game apparatus 10.

The RTC 38 counts time, and outputs the time to the information processing section 31. The information processing section 31 calculates a current time (date) based on the time counted by the RTC 38. The power supply circuit 40 controls power from the power supply (rechargeable battery) of the game apparatus 10, and supplies power to each component of the game apparatus 10.

The touch panel 13, the microphone 42, and the speaker 43 are connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on a sound signal, and converts the sound signal to a predetermined form of sound data, for example. The touch panel control circuit generates a predetermined form of touch position data based on a signal outputted from the touch panel 13, and outputs the touch position data to the information processing section 31. The information processing section 31 acquires the touch position data, to recognize a position on which an input is made on the touch panel 13.

The operation button 14 includes the operation buttons 14A to 14L described above, and operation data representing an input state (whether or not being pressed) of each of the operation buttons 14A to 14I is outputted from the operation button 14 to the information processing section 31.

The lower LCD 12 and the upper LCD 22 are connected to the information processing section 31. Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 each take an image in accordance with an instruction from the information processing section 31, and output data of the taken image to the information processing section 31.

The 3D adjustment switch 25 transmits, to the information processing section 31, an electrical signal in accordance with the position of the slider 25a.

The information processing section 31 controls whether or not the 3D indicator 26 is to be lit up. For example, the information processing section 31 lights up the 3D indicator 26 when the upper LCD 22 is in the stereoscopic display mode.

(Outline of Game)

Next, with reference to FIGS. 4 to 13, description will be made on an outline of a game (billiard game) executed by the game apparatus 10. The game adopts an augmented reality technique and is played by using a marker 50 having a predetermined pattern (character, number, symbol, any other pattern) drawn thereon which is put on a desk or the like, while the player captures an image of the marker 50 by using the outer imaging section 23 of the game apparatus 10.

Figure 4:
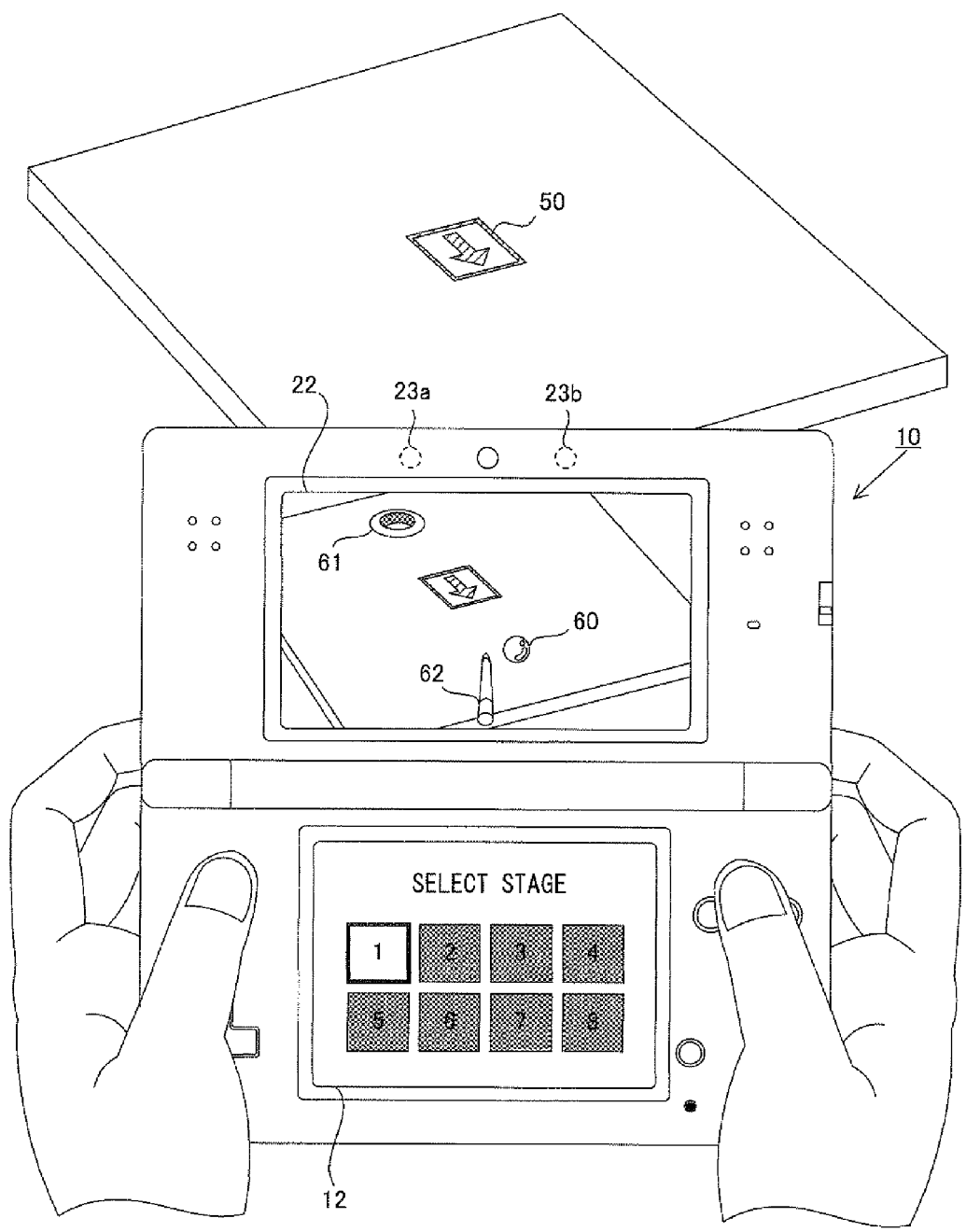
FIG. 4 shows examples of game images during a game play.

FIG. 4 shows images of a game displayed on the upper LCD 22 and the lower LCD 12 immediately after the game starts.

On the upper LCD 22, an image (stereoscopic image) obtained by synthesizing a real world image representing a real world which is currently being taken by the outer imaging section 23 and an image of a virtual object positioned in a virtual space is stereoscopically displayed. In this example, a real world image obtained by capturing an image of the marker 50 on the desk is synthesized with an image of a virtual space in which a ball object 60, a goal object 61, and a cue object 62 are positioned and a synthesized image is displayed on the upper LCD 22.

On the lower LCD 12, an image for selecting stages is displayed. A user can play only the first stage immediately after the game starts. The user can play the second stage when the first stage is cleared. An objective (clear condition) of each of the first to the seventh stages is causing the ball object 60 to reach the goal object 61 by hitting the ball object 60 with the cue object 62.

Figure 5:
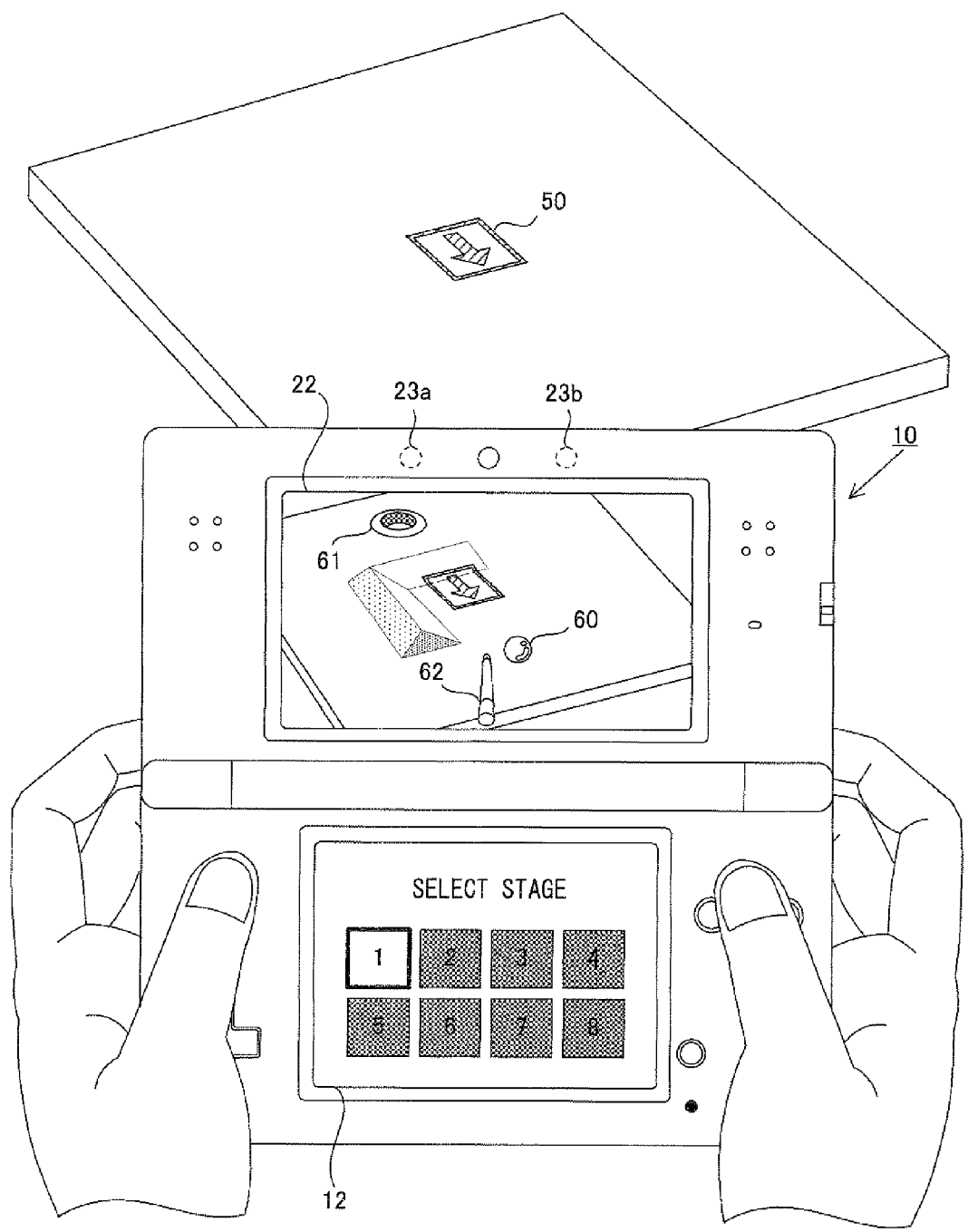
FIG. 5 shows other examples of the game image during the game play.

Immediately after the images shown in FIG. 4 are displayed, an animation display (opening presentation) showing the real world image displayed on the upper LCD 22 being partially deformed (raised or recessed) is performed, and a stereoscopic image shown in FIG. 5 is finally displayed on the upper LCD 22. In an example of FIG. 5, the desk and the marker 50 are displayed on the upper LCD 22 such that a part of the desk and a part of the marker 50 appear to be raised. Then, a play of the first stage starts.

The user moves or rotates the game apparatus 10 so as to move or rotate the cue object 62 positioned in the virtual space. In other words, a position and an orientation of the game apparatus 10 in the real world move in conjunction with a position and an orientation of the cue object 62 in the virtual space. As will be described later, a position and an orientation of the marker 50 correspond to a relative position and a relative orientation of the outer imaging section 23 relative to the marker 50. On the basis of the position and the orientation of the marker 50, a position and an orientation of each of virtual cameras 66 are determined. That is, the position and the orientation of the game apparatus 10 in which the outer imaging section 23 is provided move in conjunction with the position and the orientation of each of the virtual cameras in the virtual space. The cue object 62 is positioned at a position which is fixed relative to the virtual cameras positioned in the virtual space. Accordingly, the position and the orientation of the game apparatus 10 move in conjunction with the position and the orientation of the cue object 62.

Figure 6:
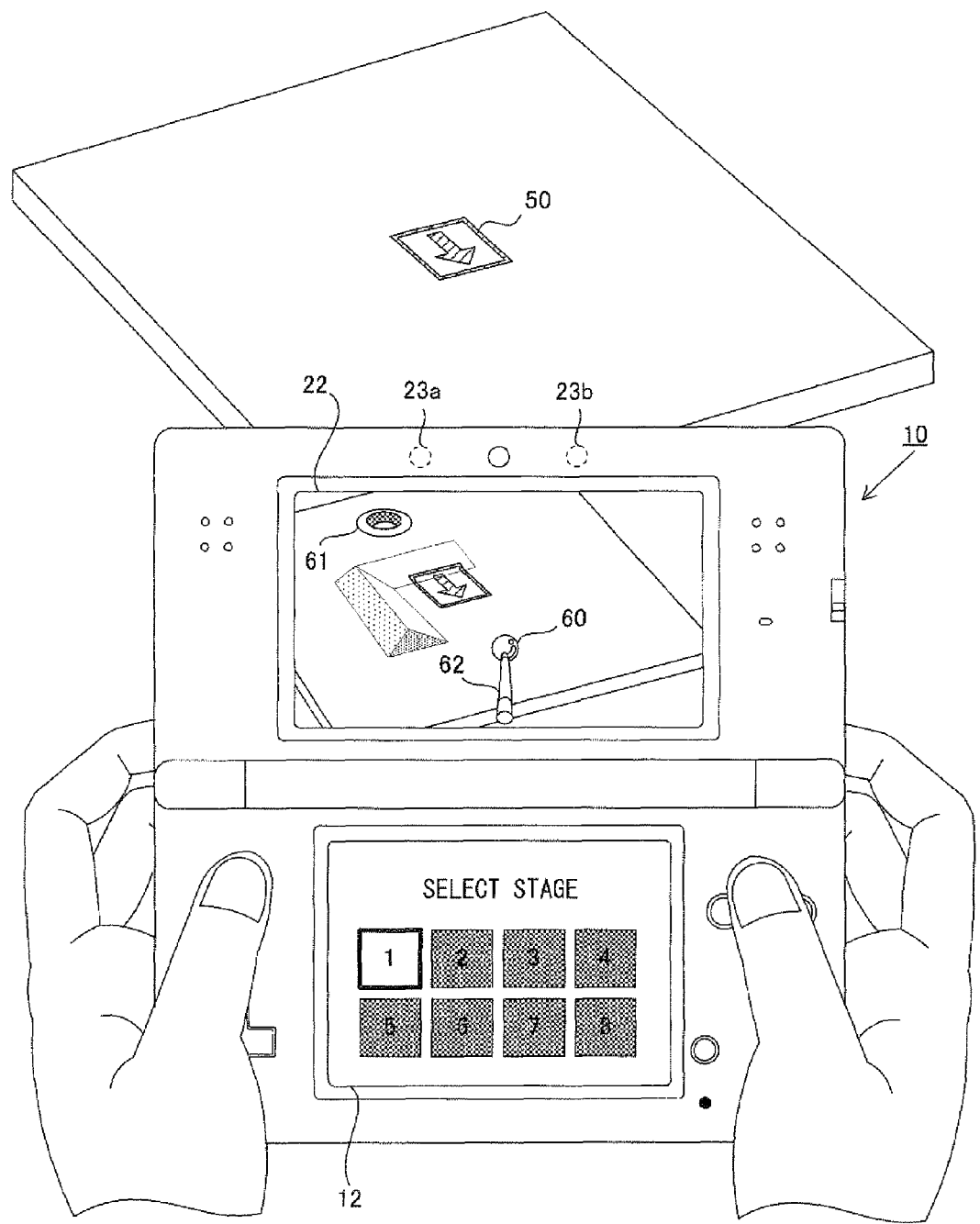
FIG. 6 shows other examples of the game image during the game play.
Figure 7:
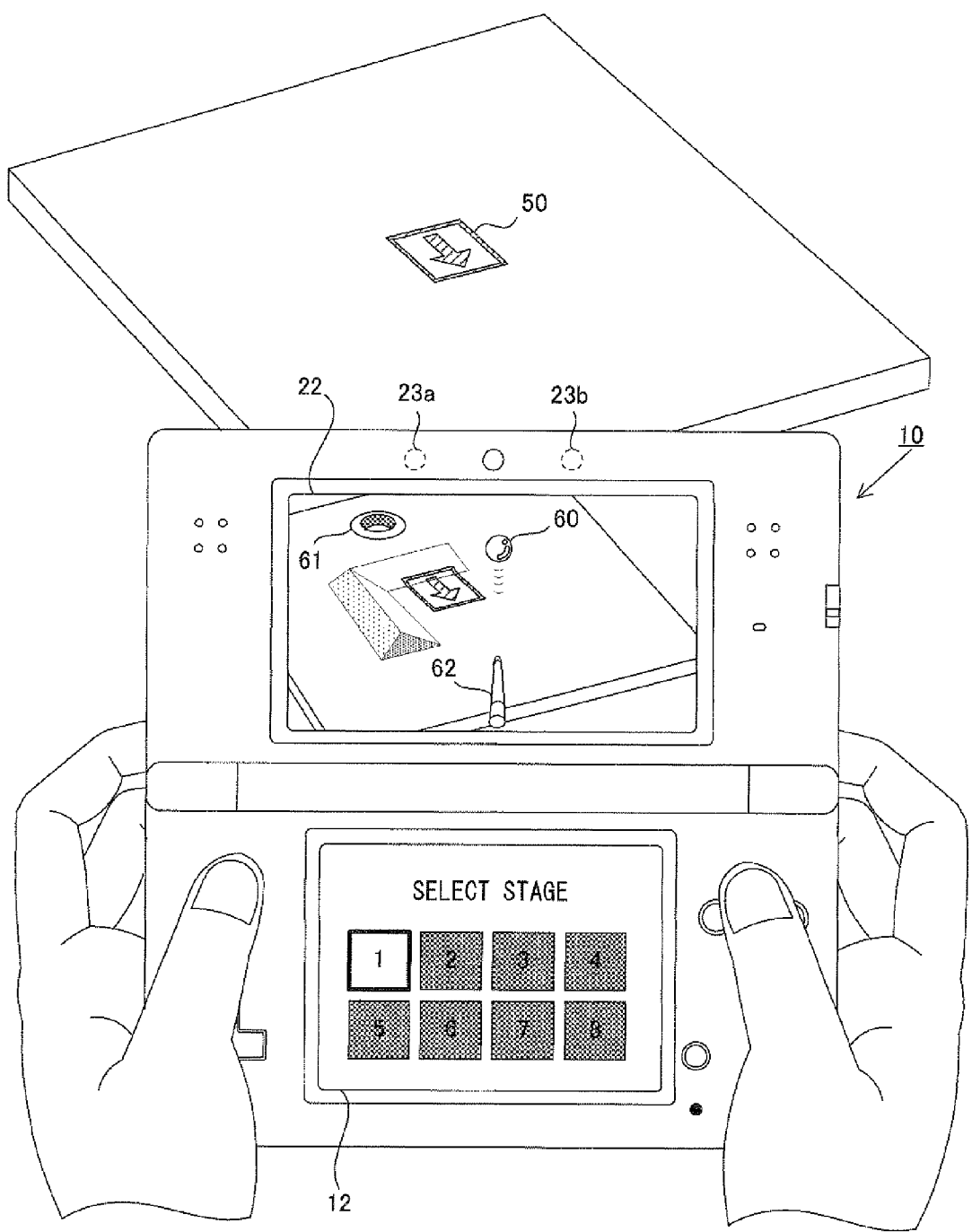
FIG. 7 shows other examples of the game image during the game play.
Figure 8:
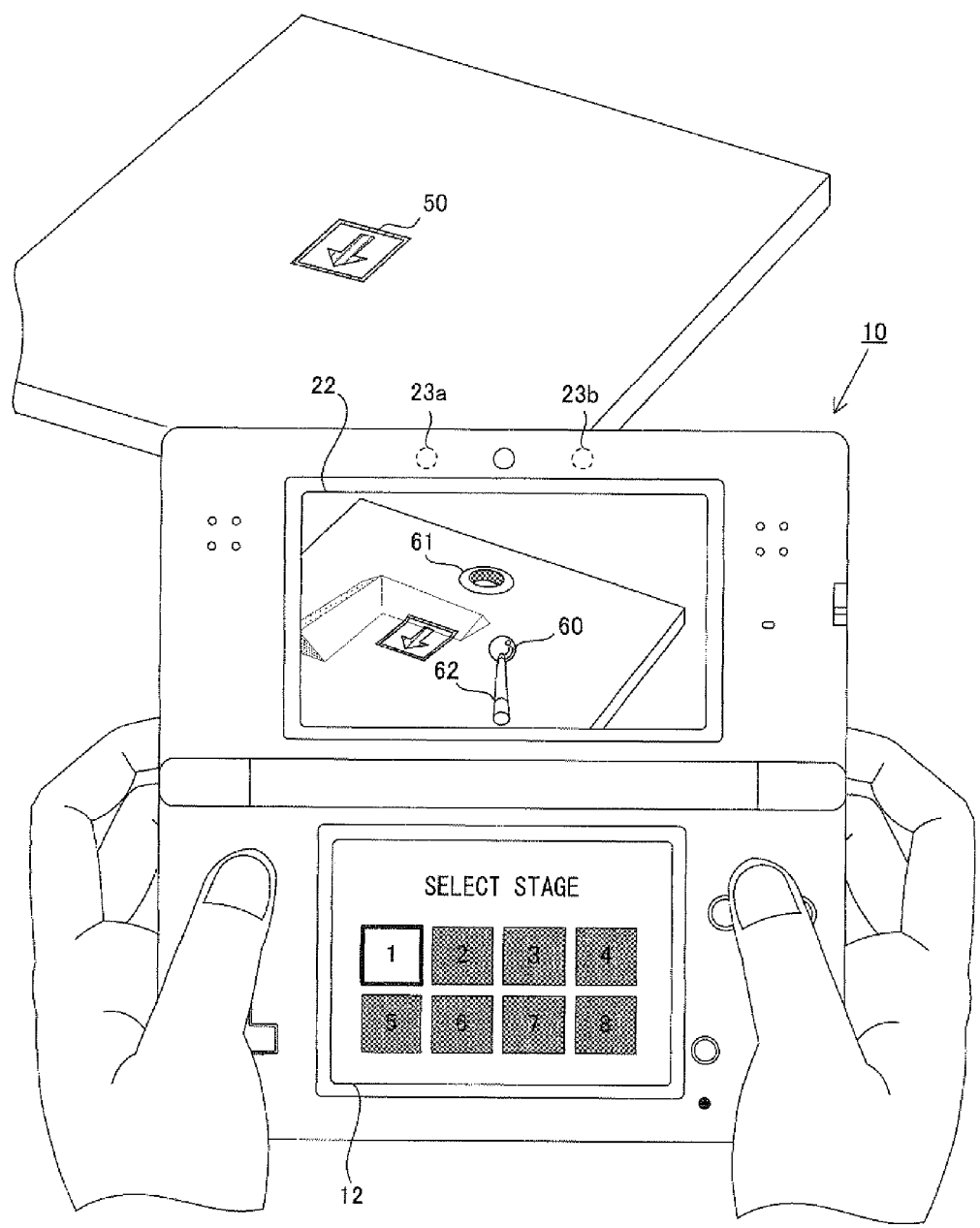
FIG. 8 shows other examples of the game image during the game play.

FIG. 6 shows a state when a user has moved the game apparatus 10 rightward from a state of FIG. 5 in order to hit the ball object 60 with the cue object 62. The cue object 62 moves in conjunction with the game apparatus 10 having moved, thereby moving the cue object 62 to a position where the cue object 62 can hit the ball object 60. In such a state, upon an operation of pressing a particular operation button (for example, the operation button 14B) by the user, the ball object 60 is moved, as shown in FIG. 7, in the direction in which the cue object 62 faces, thereby completing the first shot. That is, a moving direction of the ball object 60 is determined on the basis of the position and the orientation of the game apparatus 10.

In the same manner as the first shot, in the second shot and the following shots, the user repeats moving or rotating the game apparatus 10 so that the cue object 62 is moved to a desired position and an orientation and hits the ball object 60, until the ball object 60 reaches the goal object 61.

Figure 9:
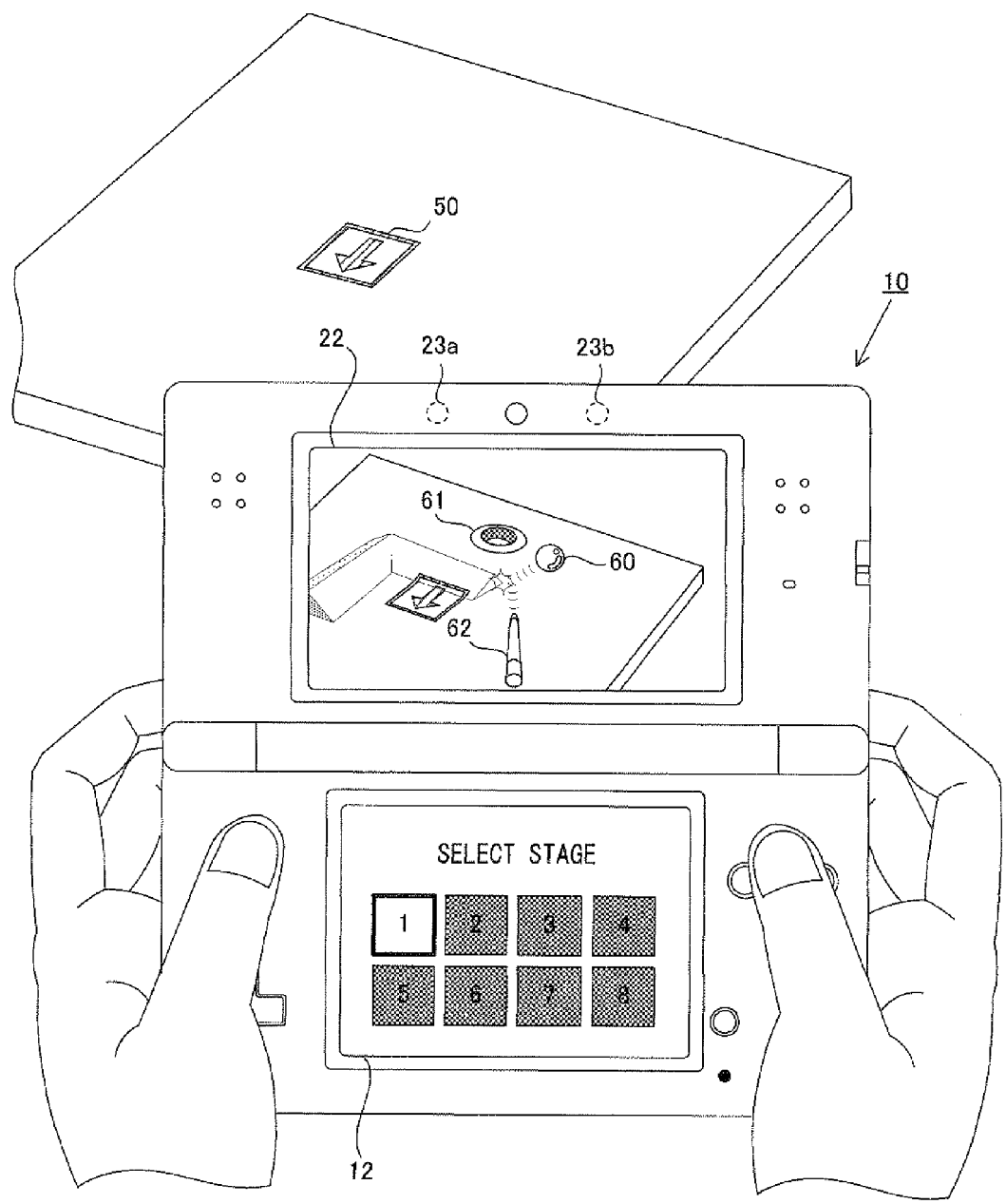
FIG. 9 shows other examples of the game image during the game play.

As described above, the desk and the marker 50 are displayed on the upper LCD 22 so as to appear to be partially raised; however, the desk and the marker 50 not only appear to be partially raised but affect movement of the ball object 60. For example, even when the user hits the ball object 60 aiming the goal object 61 in a state of FIG. 8, if the ball object 60 contacts the raised portion while it is moving as shown in FIG. 9, a moving direction and a moving speed of the ball object 60 change as shown in FIG. 9. That is, the user can have an usual experience as if the desk and the marker 50 in the real world are actually deformed during the game play.

Further, in examples of FIGS. 6 to 9, the user attempts to cause the ball object 60 to reach the goal object 61 by a route bypassing the raised portion; however, the user is free to take any route. For example, the user may take a route surmounting the raised portion in order to attempt to cause the ball object 60 to reach the goal object 61.

When the first stage is cleared, the second stage starts subsequently. In the same manner as in the first stage, also when the second stage starts, an animation display (opening presentation) showing the real world image which is partially deformed (raised or recessed) is performed. The same applies to the stages following the second stage.

Figure 10:
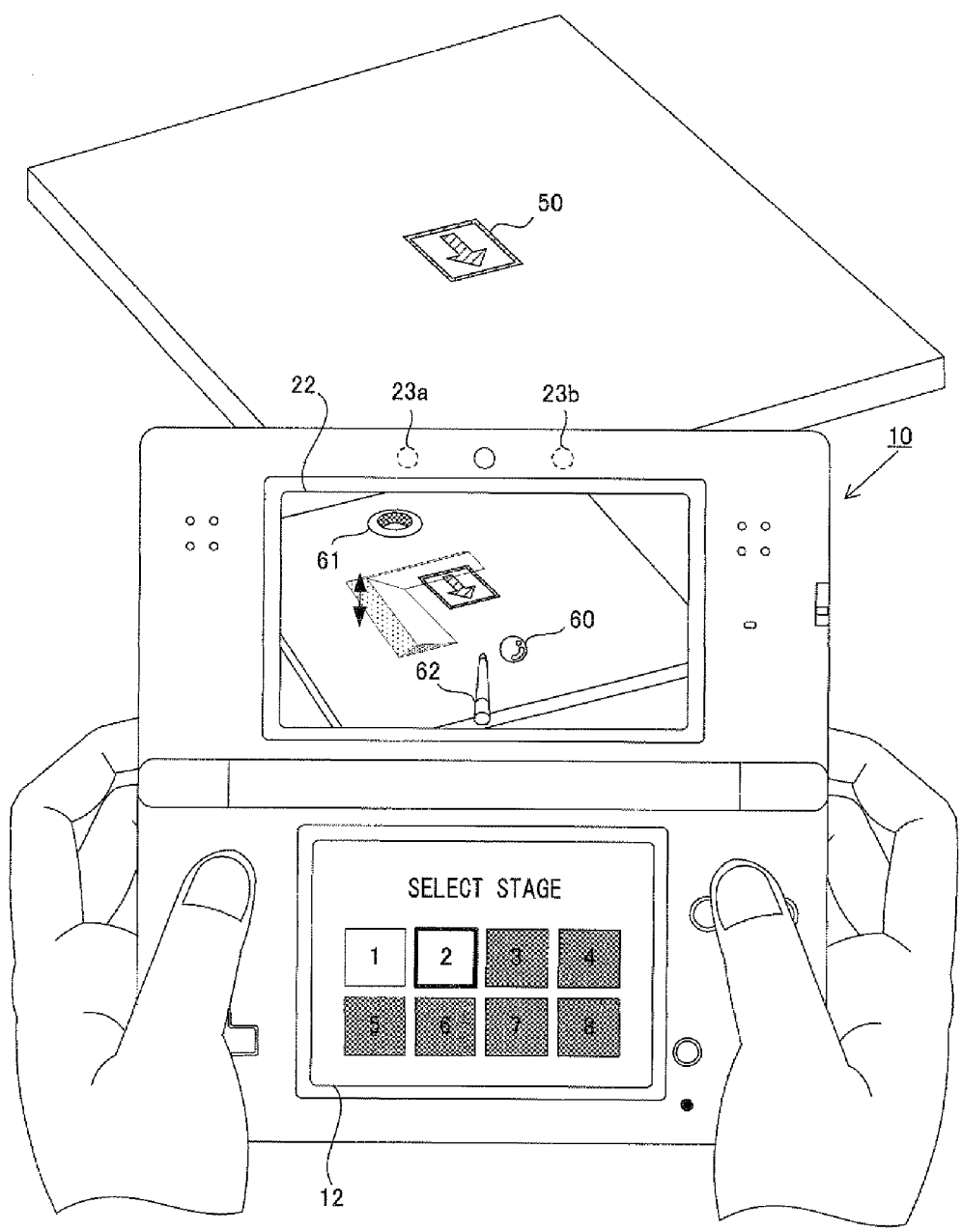
FIG. 10 shows other examples of the game image during the game play.

FIG. 10 shows images of a game displayed on the upper LCD 22 and the lower LCD 12 after the opening presentation of the second stage is performed.

In the second stage, the same area as that in the first stage is raised in the real world image. However, while a height of the raised portion is fixed in the first stage, the height of the raised portion changes periodically in the second stage. That is, the raised portion becomes higher or lower over time. Accordingly, by hitting the ball object 60 at a timing when the raised portion becomes lower, the user can cause the ball object 60 to reach the goal object 61 by a route surmounting the raised portion. When the ball object 60 is hit at a bad timing, the ball object 60 reaches the raised portion when the raised portion is higher and comes back failing to surmount the raised portion. Therefore, in the second stage, the user is required to consider a timing to hit the ball object 60, which increases the fun of the game more than in the first stage.

Figure 11:
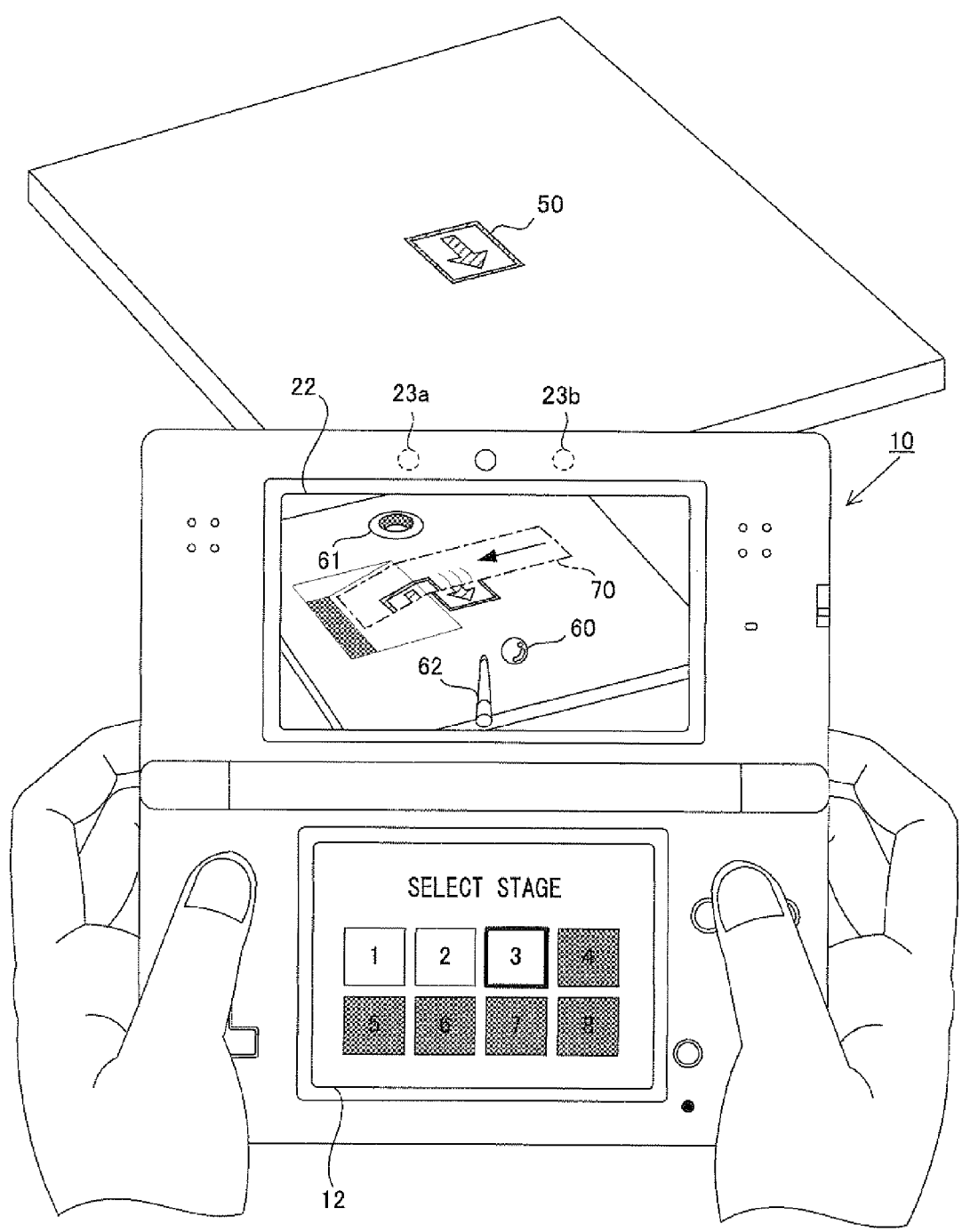
FIG. 11 shows other examples of the game image during the game play.

When the second stage is cleared, the third stage starts subsequently. As shown in FIG. 11, in the third stage, the real world image is displayed such that the real world image appear to be partially recessed and, in addition, a predetermined moving area 70 of the real world image is moving toward the recessed portion as if a belt conveyor. The moving area 70 also, not only appears to be moving toward the recessed portion as if a belt conveyor but affects the movement of the ball object 60. Accordingly, while moving on the moving area 70, the ball object 60 accelerates leftward and the moving direction is displaced leftward. Thus, the user is required to determine a direction to hit the ball object 60 while taking the above condition into consideration, which increases the fun of the game more than in the first stage.

Figure 12:
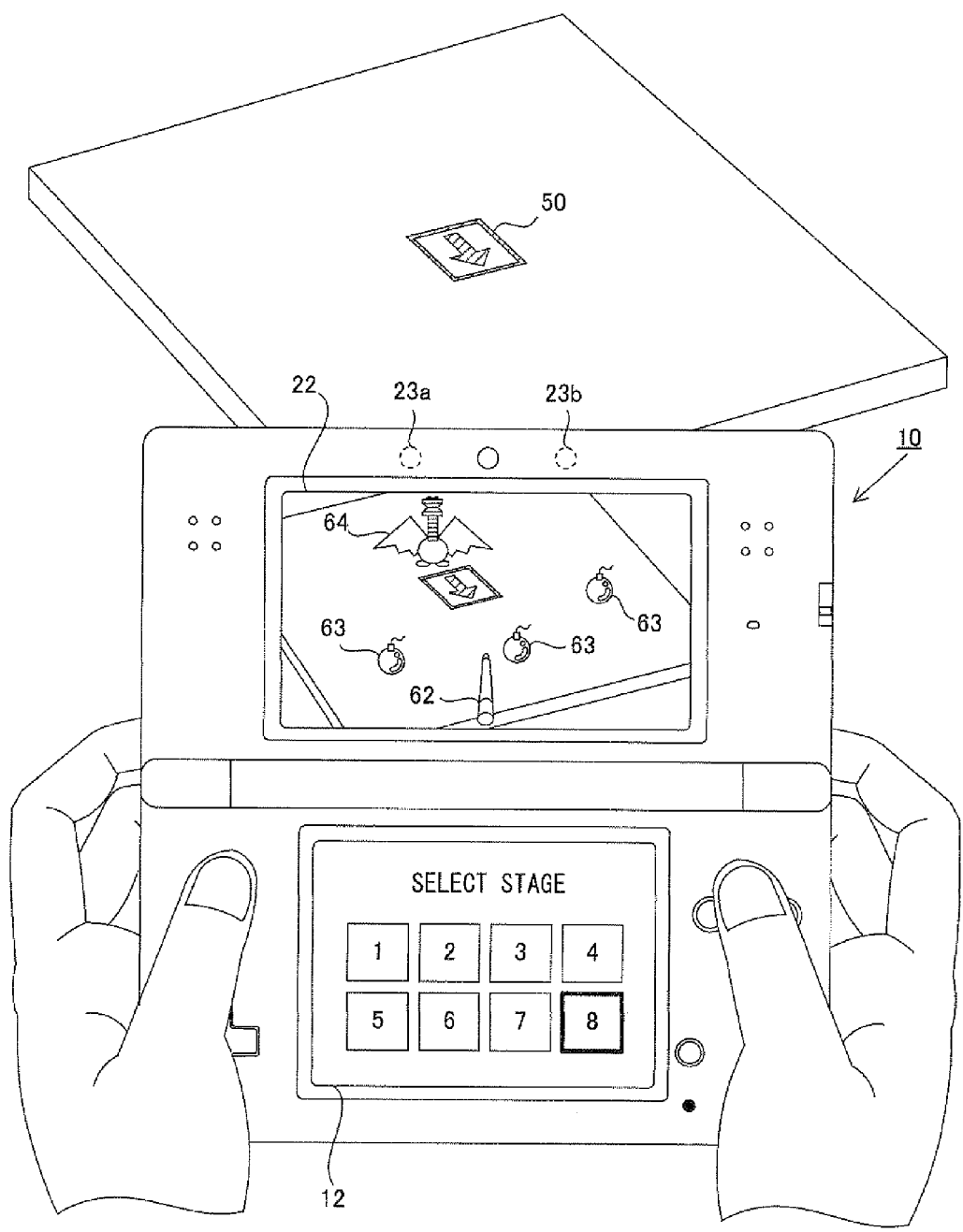
FIG. 12 shows other examples of the game image during the game play.

FIG. 12 shows images of a game displayed on the upper LCD 22 and the lower LCD 12 in the eighth stage (final stage).

An objective (clear condition) of the eighth stage is, by hitting each of bomb objects 63 with the cue object 62, causing each of the bomb objects 63 to hit and defeat an enemy object 64. Each time the bomb object 63 hits the enemy object 64, damage of the enemy object 64 is accumulated by a constant value (10, for example), and the enemy object 64 can be defeated when the accumulated damage reaches a defined value (100, for example).

Figure 13:
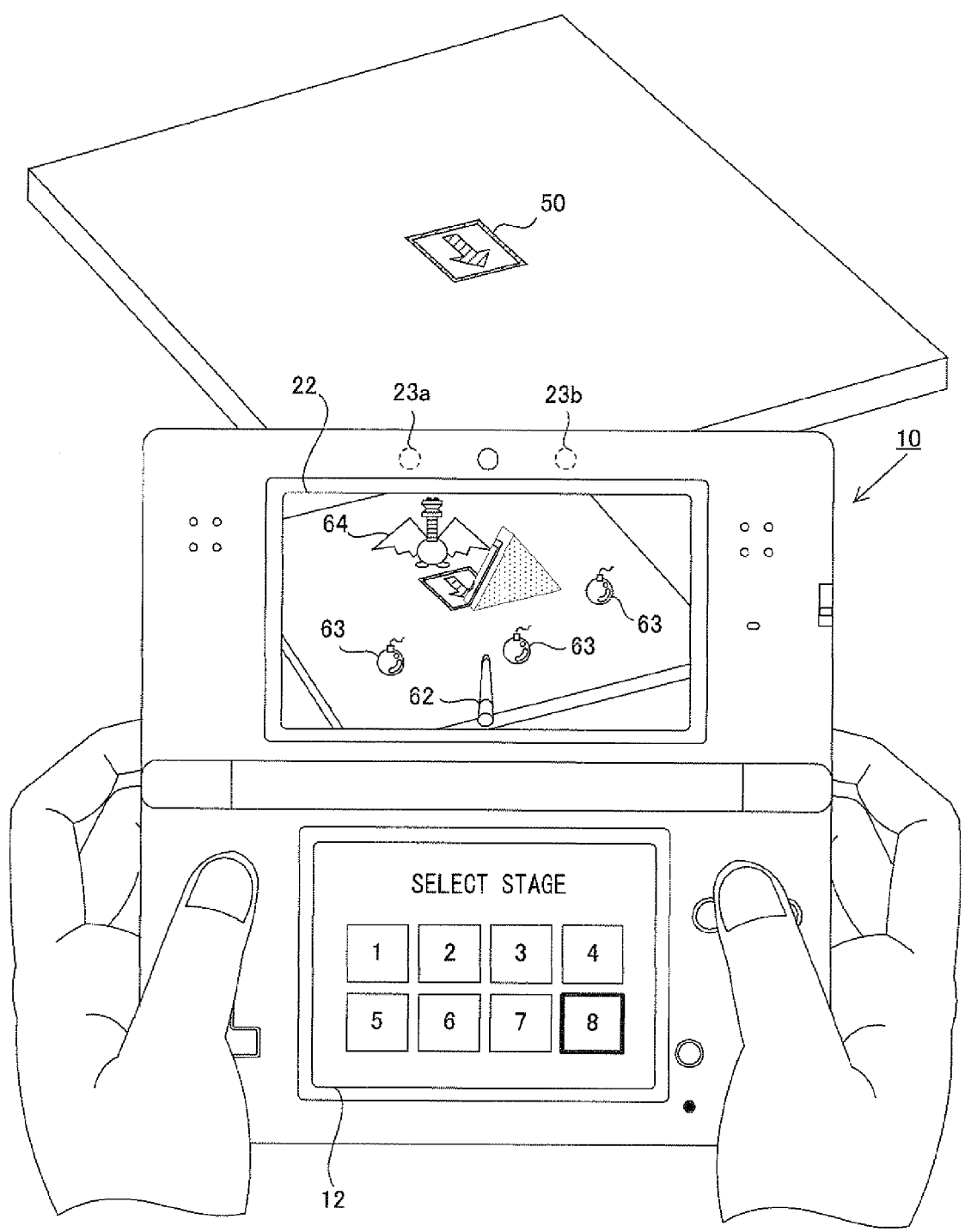
FIG. 13 shows other examples of the game image during the game play.

In the eighth stage, each time the accumulated damage of the enemy object 64 reaches a predetermined threshold (40 and 70, for example), as shown in FIG. 13, a part of the real world image is raised and changed into a barricade for protecting the enemy object 64. Accordingly, in order to further damage the enemy object 64, the user is required to take a route bypassing the barricade to cause each of the bomb objects 63 to hit the enemy object 64, which increases a difficulty level of the game. It should be noted that the real world image may be changed such that a part of the real world image is raised and changes into the barricade for protecting the enemy object 64 every time a predetermined time period elapses after the eighth stage starts.

(Details of Operations of Game Apparatus 10)

Next, with reference to FIGS. 14 to 20, description will be made on details of operations of the game apparatus 10.

Figure 14:
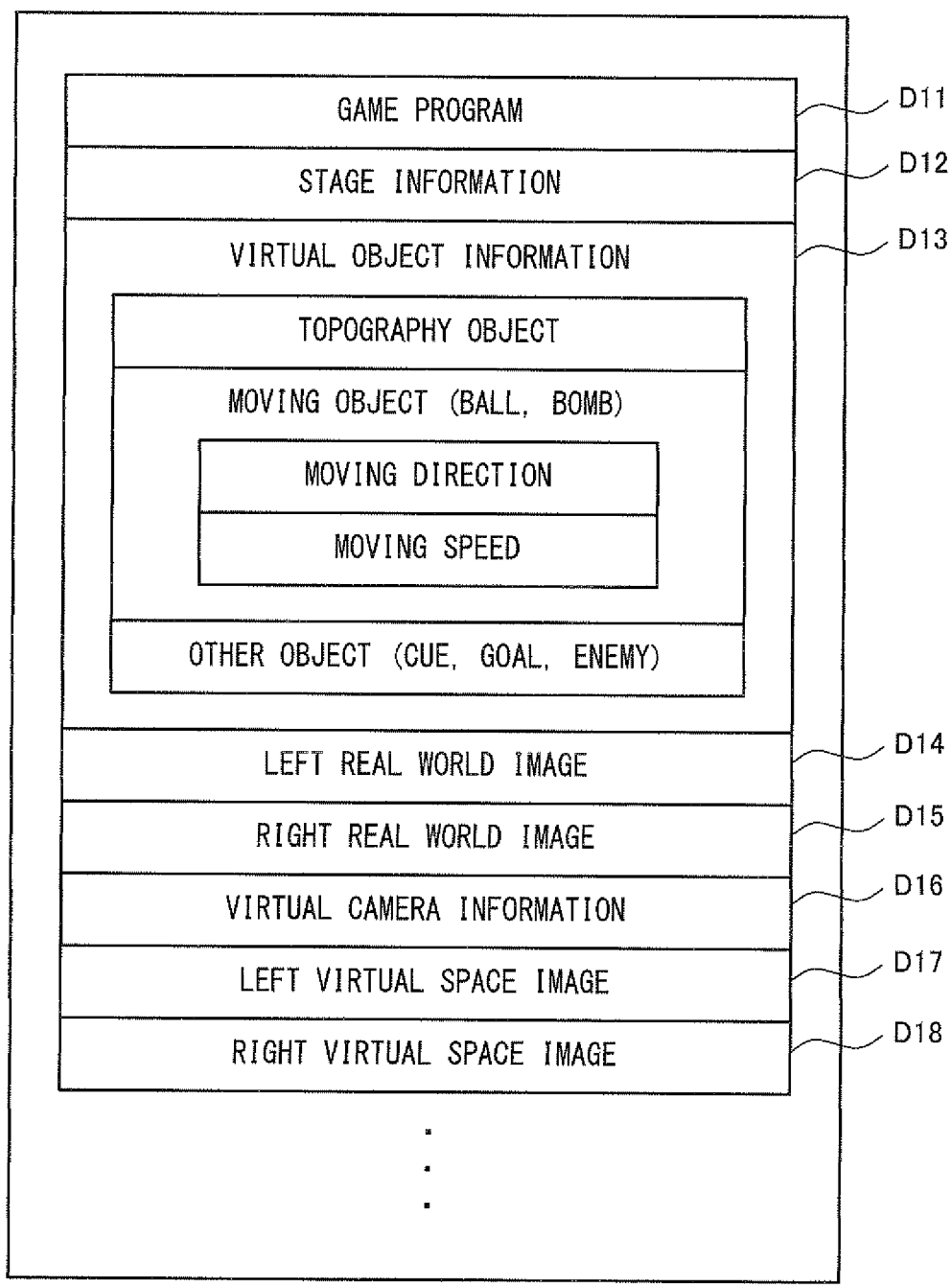
FIG. 14 is a memory map of a main memory 32.

FIG. 14 shows an example of a program and data which are stored in the main memory 32 while a game is executed.

Prior to execution of a game, a game program D11 is read from the external memory 44 or the internal data storage memory 35 to be stored in the main memory 32. It should be noted that the game program D11 may be received from a server apparatus or another game apparatus by using a wireless communication function to be stored in the main memory 32.

Stage information D12 is information which defines various virtual objects positioned in each stage and their initial positions, the above described raised portion, the recessed portion, the moving area 70, and the like.

Virtual object information D13 is information regarding various virtual objects (topography object, moving object, other objects) to be positioned in a virtual space. The virtual object information D13 includes information indicating the shape, color, pattern, position, orientation, and the like of each virtual object. With respect to moving objects (the ball object 60, the bomb object 63), the virtual object information D13 includes information indicating the moving direction and the moving speed thereof. It should be noted that the topography object is an object (see 65 in FIGS. 17 to 19) made by a great number of polygons and is positioned in the virtual space to realize a process of raising and/or recessing a part of a real world image.

A left real world image D14 is a real world image taken by the outer imaging section (left) 23a while a right real world image D15 is a real world image taken by the outer imaging section (right) 23b.

Virtual camera information D16 is information regarding a pair of virtual cameras (a left virtual camera and a right virtual camera which are described later) used for generating a stereoscopic image, and includes information indicating a position and an orientation of each of the virtual cameras in the virtual space.

A left virtual space image D17 is a virtual space image rendered based on the left virtual camera while a right virtual space image D18 is a virtual space image rendered based on the right virtual camera.

Next, with reference to FIG. 15 and FIG. 16, description will be made on a flow of a game process executed by the CPU 311 on the basis of the game program D11. The game process is started when, for example, the button 14B of the operation button 14 is pressed in a situation where a position and an orientation of the marker 50 is detected, in a real world image taken by the outer imaging section 23 indicating the real world, through a process similar to a marker recognition process described later.

Figure 15:
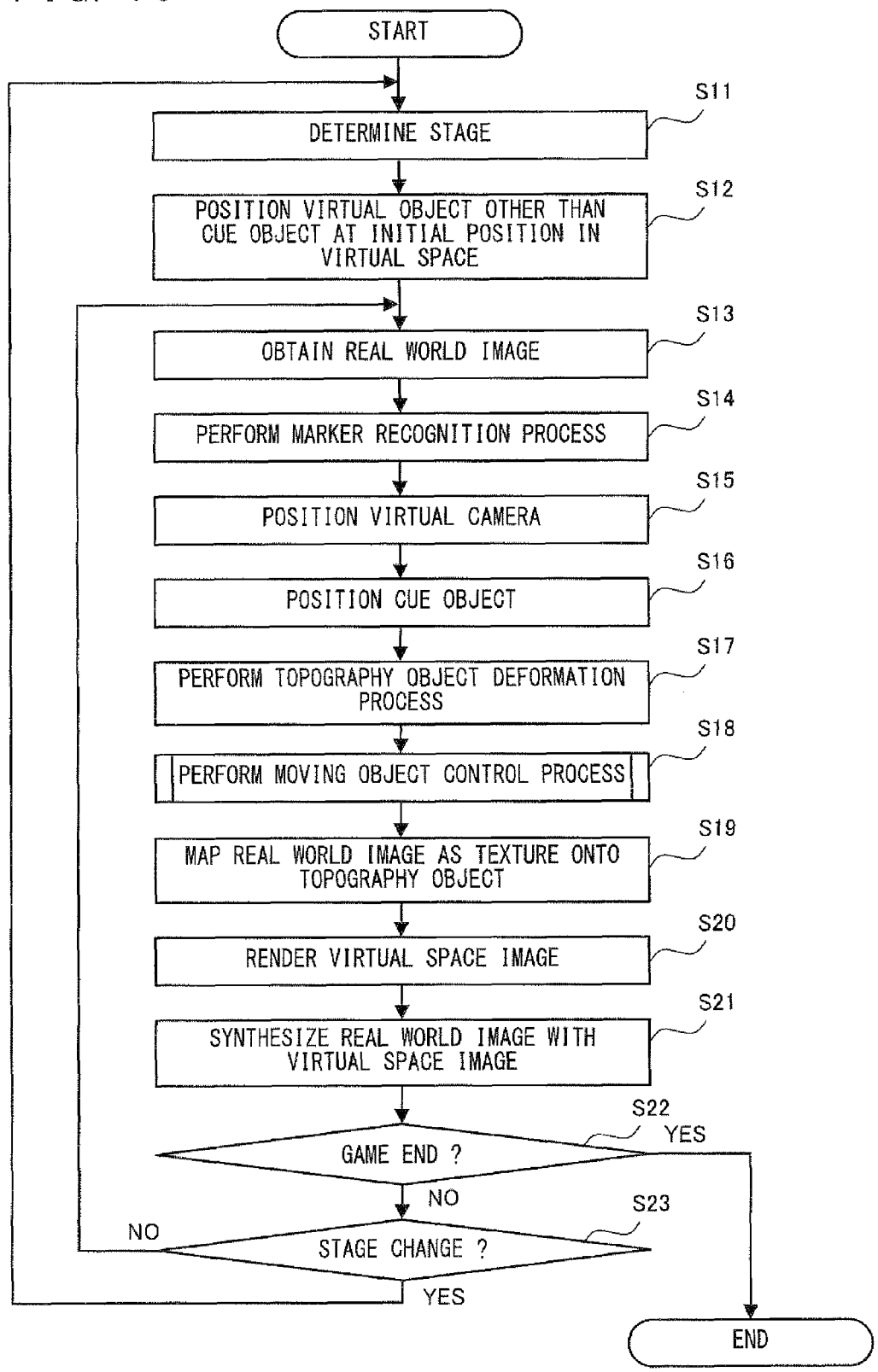
FIG. 15 is a flow chart showing an overall flow of a game process.

In step S11 of FIG. 15, the CPU 311 determines the stage. For example, in the case immediately after a game starts, the first stage is selected. In the case immediately after a certain stage is cleared, a stage subsequent to the certain stage is selected. When the user designates a stage by using the touch panel 13 or the like, the designated stage is selected.

Figure 17:
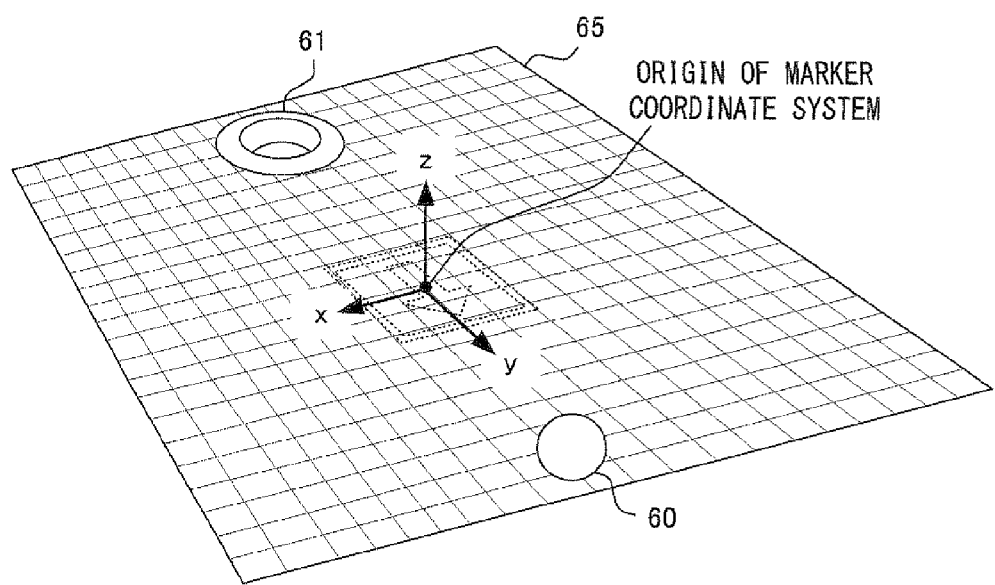
FIG. 17 shows virtual objects positioned in a virtual space.

In step S12, the CPU 311 positions the virtual objects other than the cue object 62. FIG. 17 shows, as an example, the ball object 60, the goal object 61, and the topography object 65 which are positioned in the virtual space when the first stage starts.

The topography object 65 is positioned with reference to an origin of a marker coordinate system. The marker coordinate system is a coordinate system for indicating a position in the virtual space. The origin of the marker coordinate system corresponds to the position of the marker 50 in the real world, and an x-axis direction, a y-axis direction, and a z-axis direction of the marker coordinate system correspond to a left-right direction, a front-back direction, and an up-down direction of the marker 50 in the real world, respectively. The topography object 65 can be deformed in step S17 as will be described later; however, the topography object 65 is a planar object in the initial state along an xy plane of the marker coordinate system.

Each of the ball object 60 and the goal object 61 is positioned at an initial position (an initial position defined for each object at each stage) on the topography object 65.

In step S13, the CPU 311 obtains the latest left real world image D14 and the latest right real world image D15 from the outer imaging section (left) 23a and the outer imaging section (right) 23b, respectively, and stores the obtained images in the main memory 32.

In step S14, the CPU 311 performs the marker recognition process. In the marker recognition process, the position and the orientation of the marker 50 in each of the left real world image D14 and the right real world image D15 are detected. For example, by performing an edge detection process and a pattern match process on each of the left real world image D14 and the right real world image D15, the position and the orientation of the marker 50 in each of the left real world image D14 and the right real world image D15 are detected. The position and the orientation of the marker 50 in the left real world image D14 correspond to a relative position and a relative orientation of the outer imaging section (left) 23a relative to the marker 50. Similarly, the position and the orientation of the marker 50 in the right real world image D15 correspond to a relative position and a relative orientation of the outer imaging section (right) 23b relative to the marker 50.

Figure 18:
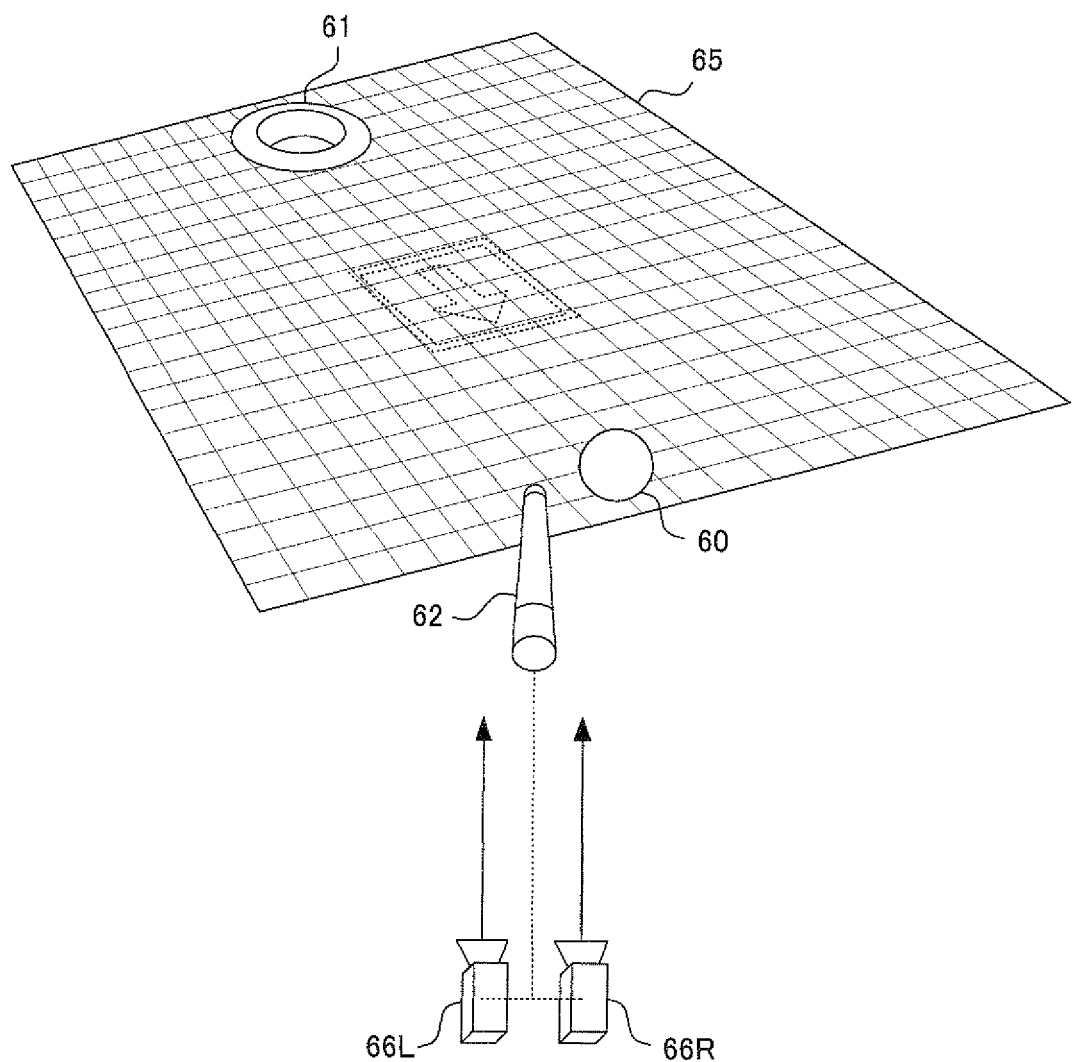
FIG. 18 illustrates a method of positioning a pair of virtual cameras and a cue object.

In step S15, the CPU 311 positions, on the basis of a result of the detection in step S14, the pair of virtual cameras (the left virtual camera 66L and the right virtual camera 66R) in the virtual space as shown in FIG. 18. Specifically, the CPU 311 determines the position and the orientation of the left virtual camera 66L in the virtual space on the basis of the position and the orientation of the marker 50 in the left real world image D14 and determines the position and the orientation of the marker 50 in the right real world image D15 on the basis of the position and the orientation of the right virtual camera 66R in the virtual space.

In step S16, as shown in FIG. 18, the CPU 311 positions, on the basis of the position and the orientation of each of the virtual cameras determined in step S15, the cue object 62 in the virtual space so as to be at a predetermined relative position and a relative orientation relative to the virtual cameras. Consequently, the position and the orientation of the game apparatus 10 in the real world move in conjunction with the position and the orientation of the cue object 62 in the virtual space.

Figure 19:
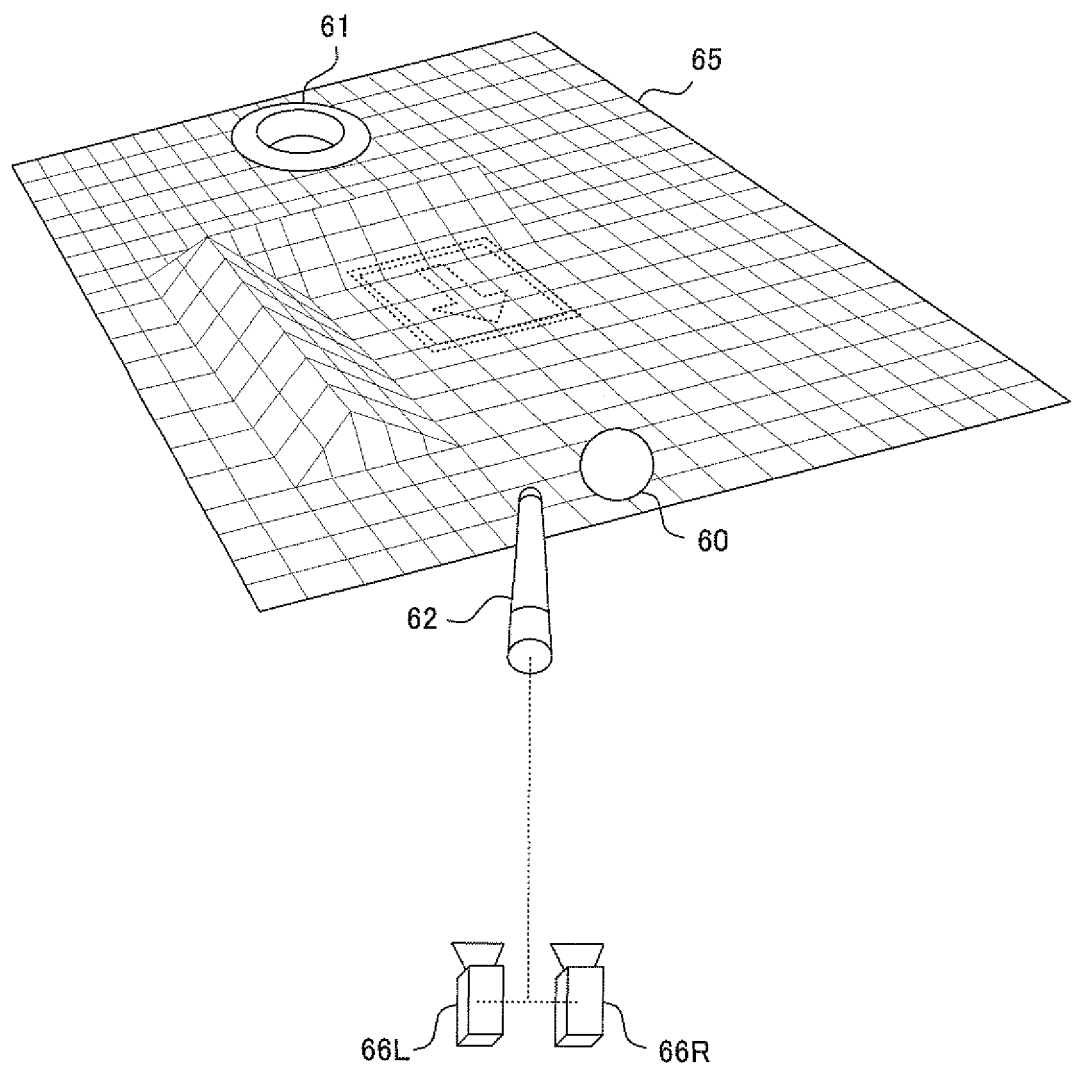
FIG. 19 shows the virtual space after a topography object 65 is deformed.

In step S17, the CPU 311 performs a topography object deformation process. For example, in the opening presentation provided immediately after the first stage starts, the topography object 65 is deformed from a shape shown in FIG. 18 into a shape shown in FIG. 19. Such deformation of the topography object 65 is performed by shifting, in the z-axis direction, the positions of respective corners of the polygons by which the topography object 65 is made (see FIG. 17). In step S17, not only the deformation process performed in the opening presentation as shown in FIG. 19 but also the periodic deformation process as shown in FIG. 10, the deformation process in a direction other than the z-axis direction, such as, for example, in a perpendicular direction to a surface of the topography object 65 as shown in FIG. 11, the deformation process which is performed when a predetermined condition is satisfied as shown in FIG. 13, and the like are performed. These deformation processes are each a process of making it difficult for the ball object 60 to reach the goal object 61, that is, a process of increasing the difficulty level of the game.

In step S18, the CPU 311 performs a moving object control process. In the following, description will be made on details of the moving object control process with reference to FIG. 16.

Figure 16:
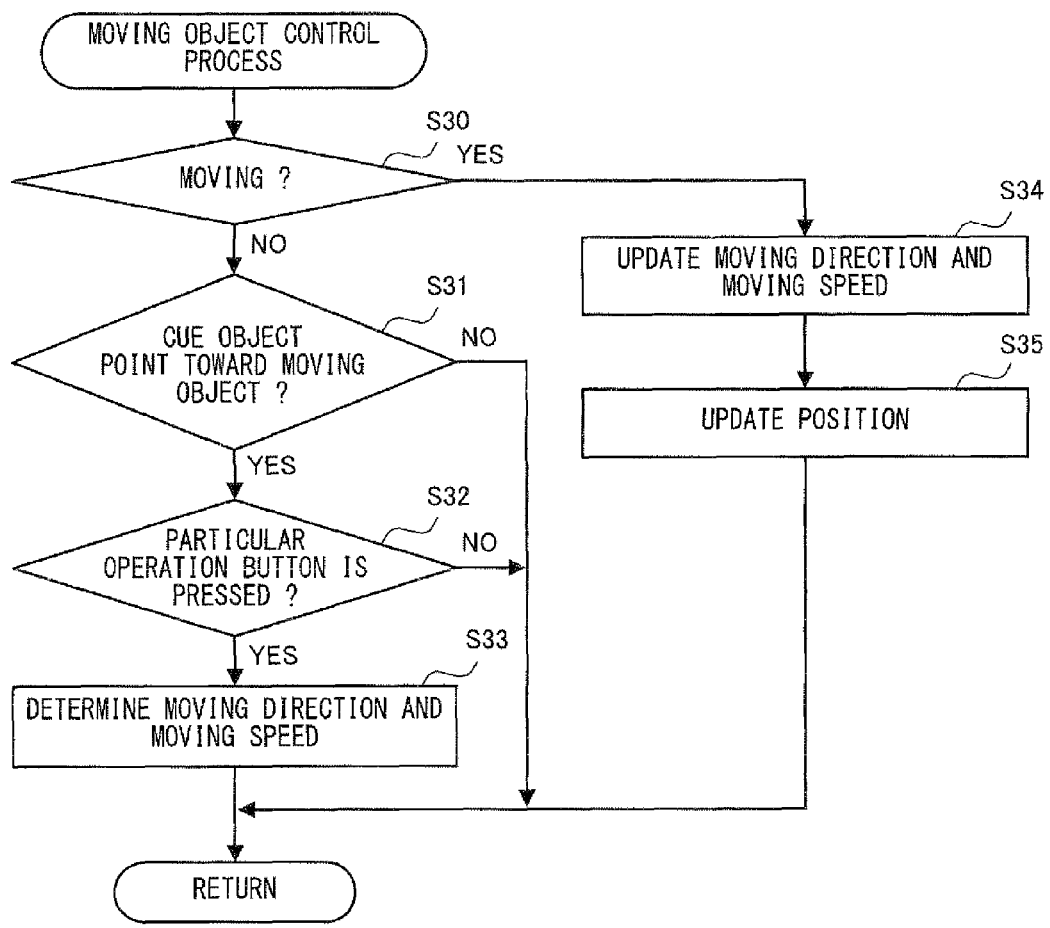
FIG. 16 is a flow chart showing a flow of a moving object control process.

In step S30 of FIG. 16, the CPU 311 determines whether a moving object (the ball object 60 or the bomb object 63) is moving. When the moving object is not moving, the CPU 311 proceeds the processing to step S31 while the CPU 311 proceeds the processing to step S34 when the moving object is moving.

In step S31, the CPU 311 determines whether the cue object 62 points toward the moving object (that is, whether a straight line passing through the central axis of the cue object 62 intersects the moving object). Then, when the cue object 62 points toward the moving object, the CPU 311 proceeds the processing to step S32, while the CPU 311 ends the moving object control process when the cue object 62 does not point toward the moving object.

In step S32, the CPU 311 determines whether a particular operation button (the operation button 14B, for example) is pressed. When the particular operation button is pressed, the CPU 311 proceeds the processing to step S33 while the CPU 311 ends the moving object control process when the particular operation button is not pressed.

In step S33, the CPU 311 determines a moving direction (an initial moving direction) and a moving speed (an initial speed) of the moving object. In the present embodiment, a three-dimensional vector, obtained by projecting a three-dimensional vector representing a direction from a back end to a front end of the cue object 62 on the xy plane (a plane at which an x coordinate value is 0) of the marker coordinate system, is determined as the moving direction (the initial moving direction) of the moving object, while the moving speed (the initial speed) of the moving object is set to a predetermined constant value. After a process of step S33, the CPU 311 ends the moving object control process.

In step S34, the CPU 311 updates the moving direction and the moving speed of the moving object. The moving direction and the moving speed of the moving object are updated at any time based on the gravity applied to the moving object and the frictional force applied to the moving object from the topography object 65 in the virtual space.

In step S35, the CPU 311 updates the position of the virtual object based on the moving direction and the moving speed updated in step S34. After the process of step S35, the CPU 311 ends the moving object control process.

Having ended the moving object control process, the CPU 311 proceeds the processing to step S19 of FIG. 15.

In step S19, the CPU 311 maps the real world image as a texture onto the topography object 65. In the present embodiment, a texture (real world image) which is mapped onto the topography object 65 when the left virtual space image D17 is rendered is different from a texture mapped when the right virtual space image D18 is rendered. When the left virtual space image D17 is rendered, the left real world image D14 is used as a texture while the right real world image D15 is used as the texture when the right virtual space image D18 is rendered.

Figure 20:
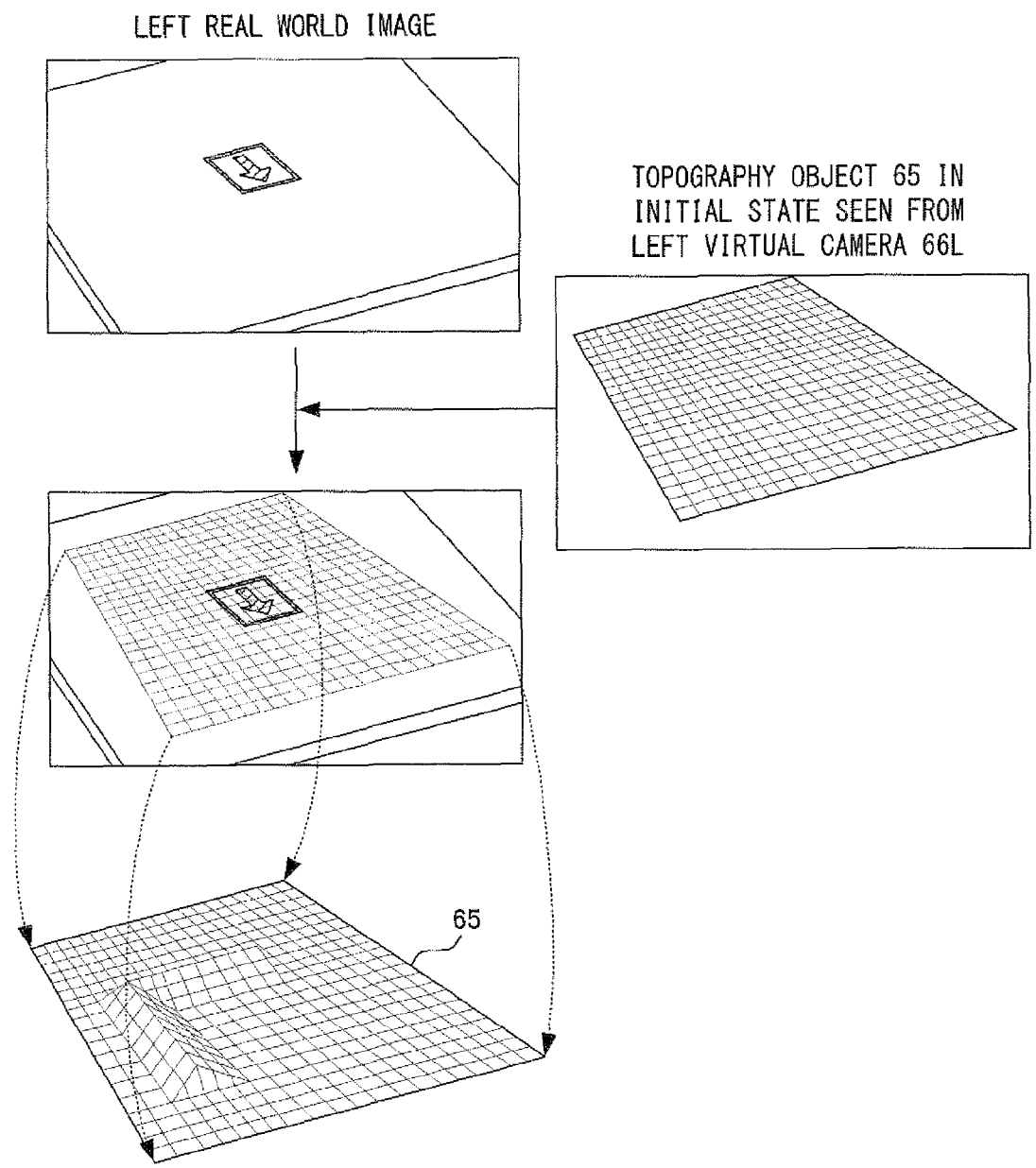
FIG. 20 illustrates texture mapping performed on the topography object 65.

FIG. 20 shows how the left real world image D14 is mapped as a texture onto the topography object 65 when the left virtual space image D17 is rendered. First, a position (two-dimensional coordinate values) of each corner of the topography object 65 (that is, the planar topography object 65 before deformation) in an initial state seen from the left virtual camera 66L is calculated. Then, on the basis of a result of the calculation, corners of the topography object 65 are associated with respective points in the left real world image D14. In accordance with the respective correspondence relationships, the left real world image D14 is mapped as a texture onto the topography object 65.

Similarly, when the right virtual space image D18 is rendered, first, a position (two-dimensional coordinate values) of each corner of the topography object 65 (that is, the planar topography object 65 before deformation) in an initial state seen from the right virtual camera 66R is calculated. Then, on the basis of a result of the calculation, corners of the topography object 65 are associated with respective points in the right real world image D15. In accordance with the respective correspondence relationships, the right real world image D15 is mapped as a texture onto the topography object 65.

In step S20, the CPU 311 renders a virtual space image. Specifically, by rendering the virtual objects (the topography object 65 onto which the left real world image D14 is mapped as a texture, the moving object, the cue object 62, and the like) based on the left virtual camera 66L, the left virtual space image D17 is generated, while the right virtual space image D18 is generated by rendering the virtual objects based on the right virtual camera 66R. The process of rendering the virtual space image is performed by, typically, the GPU 312 in accordance with an instruction from the CPU 311.

In step S21, the CPU 311 synthesizes the real world image with the virtual space image. Specifically, the left virtual space image D17 (that is, the virtual objects rendered based on the left virtual camera 66L) are written over the left real world image D14 while the right virtual space image D18 (that is, the virtual objects rendered based on the right virtual camera 66R) are written over the right real world image D15. Then, the images are outputted to the upper LCD 22 as an image for an left eye and an image for an right eye, respectively.

In step S22, the CPU 311 determines whether the game has ended. When the game has ended, the CPU 311 ends the game process, while the CPU 311 proceeds the processing to step S23 when the game has not ended.

In step S23, the CPU 311 determines whether the stage is to be changed. When the stage is to be changed, the CPU 311 returns the processing to step S11, while the CPU 311 returns the processing to step S13 when the stage is not to be changed. The stage is changed when the current stage is cleared or when the user selects a stage different from the current stage.

The above described processes of steps S13 to S21 are repeated in a constant cycle (60 times/minute, for example) so that, for example, a scene in which the ball object 60 is smoothly moving is displayed on the upper LCD 22.

(Effect of the Present Embodiment)

As described above, according to the present embodiment, a real world image is displayed on the upper LCD 22 not simply as a background. The real world image is partially deformed and, what is more, a moving direction and a moving speed of a moving object changes depend on the deformed shape of the real world image. Accordingly, a user can have an unusual experience as if the real world is actually deformed during a game play.

Furthermore, in the present embodiment, as shown in FIGS. 10 to 13, the topography object 65 is deformed in the middle of the game, the game progress will not be monotonous and the fun of the game increases.

(Modification)

In the above embodiment, the initial moving direction of the moving object is determined on the basis of the position and the orientation (that is, the relative position and the relative orientation of the game apparatus 10 relative to the marker 50 positioned in the real world) of the game apparatus 10 in the real world. However, in another embodiment, the initial moving direction of the moving object may be determined on the basis of a movement of the game apparatus 10 or a signal from any input device (the analog stick 15 or the touch panel 13, for example).

Further, in the above embodiment, the three-dimensional vector obtained by projecting the three-dimensional vector representing the direction from the back end to the front end of the cue object 62 on the xy plane (the plane at which the x coordinate value is 0) of the marker coordinate system, is determined as the initial moving direction of the moving object. However, in another embodiment, the three-dimensional vector representing the direction from the back end to the front end of the cue object 62 may be used, as it is, as the initial moving direction of the moving object. When a user attempts to designate a three-dimensional direction, a normal input device such as a joy stick or a touch panel does not allow the user to designate a three-dimensional direction without difficulty. However, if a three-dimensional direction can be designated in accordance with the position and the orientation of the game apparatus 10 in the real world, the direction can be designated easily and intuitively, and thus the operability is improved. It should be noted that the position and the orientation of the game apparatus 10 in the real world are not limited to those calculated on the basis of the position and the orientation of the marker 50 in the real world image as in the above embodiment, and may be calculated using, for example, an acceleration sensor, an angular velocity sensor, and the like.

Further, in the above embodiment, the initial speed of the moving object is set to the constant value; however, in another embodiment, the initial speed of the moving object may change in accordance with a distance (that is, a distance from each of the pair of the virtual cameras to the moving object) from the front end of the cue object to the moving object.

Further, in the above embodiment, the topography object 65 is planar immediately after each stage starts, and after the opening presentation, the topography object 65 is deformed to a shape in accordance with each stage; however, in another embodiment, the topography object 65 having a shape in accordance with each stage may be positioned in the virtual space immediately after each stage starts.

Further, in the above embodiment, the topography object 65 is deformed in accordance with each stage; however, in another embodiment, a topography object having a different shape may be previously prepared for each stage.

Further, in the above embodiment, in step S17 of FIG. 15, the entirety of the topography object 65 is transformed (that is, each corner of the topography object 65 is shifted) such that the moving area 70 is displayed so as to be moving as shown in FIG. 11. However, in another embodiment, the moving area 70 may be displayed so as to be moving by changing texture coordinates which are used when mapping a texture onto the topography object 65 without deforming the topography object 65 itself.

Further, in the above embodiment, the real world image taken by the outer imaging section 23 is synthesized with the virtual space image and an synthesized image is displayed on the upper LCD 22 (video see-through technique); however, the present invention is not limited thereto. The present invention may be applied to a game apparatus and a game system using an optical see-through technique which displays a virtual object on a transmissive display screen and allows a user to view as if the virtual object really exists in the real world seen through the transmissive display screen.

Further, in the above embodiment, on the basis of a result of the marker detection process, the position and the orientation of the left virtual camera 66L and the position and the orientation of the right virtual camera 66R are respectively determined; however in another embodiment, the position and the orientation of one of the virtual cameras may be determined on a result of the marker detection process, and then the position and the orientation of the other of the virtual cameras may be determined on the basis of the position and the orientation of the one of the virtual cameras.

Further, in the above embodiment, the position and the orientation of each virtual camera are calculated relative to a position (origin) in the virtual space which corresponds to the marker 50 in the real world as necessary on the basis of a result of the marker detection process. However, in another embodiment, the position and the orientation of each virtual camera and those of the cue object 62 in the virtual space may be fixed, and the position and the orientation of each of other virtual objects may be determined on the basis of a result of the marker detection process as necessary.

Further, in the above embodiment, the position and the orientation of each virtual camera are determined on the basis of the position and the orientation of the marker 50 included in the real world image; however, in another embodiment, the position and the like of each virtual camera may be determined on the basis of a position and the like of a object (a face, a hand, for example) to be identified in the real world image other than the marker 50.

Further, in the above embodiment, an example has been described in which the left real world image D14 is used as a texture for the topography object 65 when the left virtual space image D17 is rendered, while the right real world image D15 used as a texture for the topography object 65 when the right virtual space image D18 is rendered. However, in another embodiment, one of the left real world image D14 and the right real world image D15 may be commonly used as a texture for the topography object 65 both when the left virtual space image D17 is rendered and when the right virtual space image D18 is rendered.

Further, in the above embodiment, an example has been described in which a stereoscopic image is displayed on the upper LCD 22; however, the present invention is not limited thereto but may be applied when a planar view image is displayed. For example, on the basis of a real world image obtained from one of the outer imaging section (left) 23a and the outer imaging section (right) 23b, a single virtual camera may be positioned in the virtual space and processes similar to those in the above embodiment may be performed.

Further, in the above embodiment, an example has been described in which the process of the game program D11 is executed by a CPU (CPU 311); however, in another embodiment, at least a part of the process of the game program D11 may be executed by only a hardware.

Further, in the above embodiment, an example of the billiard game has been described; however, the present invention is not limited thereto and may be applied to a game in which a moving object moves along a topography object. In addition, the present invention is applicable not only to game software but also to any application software.

Further, in the above embodiment, descriptions have been made on the game apparatus 10 which is portable; however, in another embodiment, any information processing apparatus (a stationary game apparatus, a desktop PC, a notebook PC, a mobile phone, and the like) may be used as the game apparatus or the game system.

Further, in the above embodiment, an example has been described in which the process of the game program D11 is executed by a single CPU (CPU 311); however, in another embodiment, the process of the game program D11 may be shared by a plurality of processors. The plurality of processors may be provided in a single information processing apparatus or may be separately provided in a plurality of information processing apparatuses which can communicate with each other in the same manner as a server apparatus and client apparatuses.

While the present invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program for causing a computer of an information processing apparatus connected with an imaging device and a display device to perform functionality comprising:
   obtaining a real world image by capturing an image of a real world by using the imaging device;
   positioning a moving object in a virtual space;
   positioning a topography object having a portion with different heights in the virtual space;
   moving the moving object depending on a shape of the topography object;
   mapping at least a part of the real world image as a texture onto the topography object;
   generating a virtual space image by rendering the moving object and the topography object onto which at least the part of the real world image has been mapped as the texture; and
   displaying the virtual space image on the display device so as to be viewed by a user in a manner such that the virtual space image is superimposed on the real world image.

2. The non-transitory computer-readable storage medium according to claim 1, wherein the information processing program further causes the computer to perform functionality comprising deforming the positioned topography object.

3. The non-transitory computer-readable storage medium according to claim 2, wherein the topography object is deformed periodically over time.

4. The non-transitory computer-readable storage medium according to claim 2, wherein the topography object is deformed in a direction along a surface of the topography object.

5. The non-transitory computer-readable storage medium according to claim 2, wherein the topography object is deformed when a condition is satisfied.

6. The non-transitory computer-readable storage medium according to claim 1, wherein
   positioning the topography object includes:
   positioning a planar topography object in the virtual space; and
   changing a height of at least a part of the positioned planar topography object.

7. The non-transitory computer-readable storage medium according to claim 1, wherein
   the information processing program further causes the computer to perform functionality comprising:
   detecting an object to be identified from the real world image;
   positioning a virtual camera in the virtual space on the basis of a result of the detection; and
   rendering the moving object and the topography object on the basis of the virtual camera.

8. The non-transitory computer-readable storage medium according to claim 1, wherein
   the imaging device and the display device are integrally provided with the information processing apparatus, and
   moving the moving object includes:
   determining a moving direction of the moving object on the basis of a position and an orientation of the information processing apparatus in the real world.

9. The non-transitory computer-readable storage medium according to claim 1, wherein
   the imaging device and the display device are integrally provided with the information processing apparatus, and
   moving the moving object includes:
   determining a moving speed of the moving object on the basis of a position and an orientation of the information processing apparatus in the real world.

10. The non-transitory computer-readable storage medium according to claim 1, wherein
    the moving object moves in accordance with an operation by the user, and
    the information processing program further causes the computer to perform functionality comprising:
    executing a predetermined game process on the basis of a position of the moving object which has been moved in the virtual space.

11. The non-transitory computer-readable storage medium according to claim 1, wherein the topography object is formed from a real-world terrain and is viewed as extending from the real-world terrain.

12. The non-transitory computer-readable storage medium according to claim 1, wherein the topography object is formed from a real-world terrain and is viewed as extending into the real-world terrain.

13. The non-transitory computer-readable storage medium according to claim 1, wherein the virtual space image is displayed on the display device so as to be viewed by the user such that the virtual space image is superimposed on one of the real world image and the real world seen through a screen of the display device.

14. An information processing apparatus comprising:
    a real world image obtainer for obtaining a real world image by capturing an image of a real world by using an imaging device;
    a moving object positioner for positioning a moving object in a virtual space;
    a topography object positioner for positioning a topography object having a portion with different heights in the virtual space;
    a movement controller for moving the moving object depending on a shape of the topography object;
    a texture mapper for mapping at least a part of the real world image as a texture onto the topography object;
    a virtual space image generator for generating a virtual space image by rendering the moving object and the topography object onto which at least the part of the real world image has been mapped as the texture; and
    a display controller for displaying the virtual space image on a display device so as to be viewed by a user in a manner such that the virtual space image is superimposed on the real world image.

15. An information processing system comprising:
    an imaging device;
    a display device; and at least one processor configured to perform functionality comprising:
 obtaining a real world image by capturing an image of a real world by using the imaging device,
 positioning a moving object in a virtual space,
 positioning a topography object having a portion with different heights in the virtual space,
 moving the moving object depending on a shape of the topography object,
 mapping at least a part of the real world image as a texture onto the topography object,
 generating a virtual space image by rendering the moving object and the topography object onto which at least the part of the real world image has been mapped as the texture, and
 displaying the virtual space image on the display device so as to be viewed by a user in a manner such that the virtual space image is superimposed on the real world image.

16. An information processing method which is implemented by a control section of an information processing apparatus, the method comprising:
 an image of a real world by using an imaging device;
 positioning a moving object in a virtual space;
 positioning a topography object having a portion with different heights in obtaining a real world image obtained by capturing the virtual space;
 moving the moving object depending on a shape of the topography object;
 mapping at least a part of the real world image as a texture onto the topography object;
 generating a virtual space image by rendering the moving object and the topography object onto which at least the part of the real world image has been mapped as the texture; and
 displaying the virtual space image on a display device so as to be viewed by a user in a manner such that the virtual space image is superimposed on the real world image.

17. An information processing system comprising:
 a marker which is positioned in a real world;
 an imaging device;
 a display device; and
 at least one processor configured to perform functionality comprising:
  obtaining a real world image by capturing an image of the real world by using the imaging device,
  detecting the marker from the real world image,
  positioning a virtual camera in a virtual space on the basis of a result of the detection,
  positioning a moving object in the virtual space,
  positioning a topography object having a portion with different heights in the virtual space,
  moving the moving object depending on a shape of the topography object,
  mapping at least a part of the real world image as a texture onto the topography object,
  generating a virtual space image by rendering, on the basis of the virtual camera, the moving object and the topography object onto which at least the part of the real world image has been mapped as the displaying the virtual space image on the display device so as to be viewed by a user in a manner such that the virtual space image is superimposed on the real world image.

18. An information processing system, comprising:
 a memory; and
 at least one processor operatively associated with the memory and configured to perform functionality comprising:
  obtaining a real world image by capturing an image of a real world using an imaging device,
  generating a topography object having a portion with different heights in a virtual space, the topography object having a texture containing at least a part of the obtained real world image,
  conditioning movement of a generated moving object in the virtual space based on a shape of the topography object,
  generating a virtual space image by rendering the moving object and the topography object, and
  displaying the virtual space image on the display device so as to be viewed by a user in a manner such that the virtual space image is superimposed over the real world image.

19. The system of claim 18, wherein the texture of the topography object as viewed in the displayed virtual space image varies depending upon the height of the topography object in the virtual space.

* * * * *